(12) United States Patent
Sakanashi et al.

(10) Patent No.: US 10,768,975 B2
(45) Date of Patent: Sep. 8, 2020

(54) INFORMATION PROCESSING SYSTEM, INFORMATION PROCESSING APPARATUS, AND INFORMATION PROCESSING METHOD

(71) Applicants: Ryutaro Sakanashi, Kanagawa (JP); Yuuichiroh Hayashi, Kanagawa (JP); Dongzhe Zhang, Kanagawa (JP)

(72) Inventors: Ryutaro Sakanashi, Kanagawa (JP); Yuuichiroh Hayashi, Kanagawa (JP); Dongzhe Zhang, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 411 days.

(21) Appl. No.: 15/439,246

(22) Filed: Feb. 22, 2017

(65) Prior Publication Data
US 2017/0255495 A1 Sep. 7, 2017

(30) Foreign Application Priority Data

Mar. 4, 2016 (JP) .................................. 2016-042844
Jun. 6, 2016 (JP) .................................. 2016-112522

(51) Int. Cl.
*G06F 9/48* (2006.01)
(52) U.S. Cl.
CPC .................................. *G06F 9/4843* (2013.01)
(58) Field of Classification Search
CPC ... G06F 9/46; G06F 9/465; G06F 9/48; G06F 9/4843; G06F 9/54; G06F 9/541; G06F 9/542
(Continued)

(56) References Cited

U.S. PATENT DOCUMENTS 7,373,349 B2 * 5/2008 O'Brien ............... G06Q 10/087
                                                         707/736
7,805,324 B2 * 9/2010 Green .................... G06Q 10/06
                                                         705/7.27
(Continued)

FOREIGN PATENT DOCUMENTS

JP     2007-282199     10/2007
JP     2010-219625      9/2010
(Continued)

OTHER PUBLICATIONS

Paul Johannesson and Erik Perjons. 2001. Design principles for process modelling in enterprise application integration. Inf. Syst. 26, (May 3, 2001), 165-184. DOI=http://dx.doi.org/10.1016/50306-4379(01)00015-1 (Year: 2001).*

(Continued)

*Primary Examiner* — Andrew M. Lyons
(74) *Attorney, Agent, or Firm* — IPUSA, PLLC

(57) ABSTRACT

An information processing system includes a memory and processors. The memory stores flow information and flow-identification information for each process sequence performed by using electronic data. The flow information defines program-identification information identifying programs for executing the process sequence, and an execution order of the programs. The processors execute computer-executable instructions stored in the memory to execute a process including accepting a request including information relating to the electronic data and the flow-identification information, from a device coupled to the system; acquiring the flow information associated with the flow-identification information included in the request, from the memory; and executing the process sequence using the electronic data based on the information relating to the electronic data, by executing the programs identified by the program-identification information defined in the acquired flow information, (Continued)

in the execution order. When the process sequence includes branching, the processes are branched according to a branch condition.

19 Claims, 33 Drawing Sheets

(58) Field of Classification Search
USPC .......................................................... 717/104
See application file for complete search history.

(56) References Cited

U.S. PATENT DOCUMENTS

| | | | | |
|---|---|---|---|---|
| 7,840,949 | B2* | 11/2010 | Schumacher | G06F 8/10 710/71 |
| 7,941,794 | B2* | 5/2011 | Ozone | G06F 8/433 712/201 |
| 8,132,148 | B2* | 3/2012 | Williams | G06F 9/451 717/107 |
| 8,225,282 | B1* | 7/2012 | Massoudi | G06F 8/31 717/104 |
| 8,296,727 | B2* | 10/2012 | Degenhardt | G06Q 10/06 717/109 |
| 8,437,016 | B2* | 5/2013 | Takahashi | H04N 1/00968 358/1.13 |
| 8,521,570 | B2* | 8/2013 | Sadiq | G06Q 10/06 705/7.11 |
| 8,903,762 | B2* | 12/2014 | Jin | G06F 8/20 707/602 |
| 9,548,941 | B2* | 1/2017 | Tompkins | H04L 47/762 |
| 9,729,615 | B2* | 8/2017 | Nair | H04L 67/10 |
| 9,940,598 | B2* | 4/2018 | Ohashi | G06Q 10/06316 |
| 2003/0004746 | A1* | 1/2003 | Kheirolomoom | G06Q 10/10 717/104 |
| 2003/0084127 | A1* | 5/2003 | Budhiraja | G06F 8/20 709/220 |
| 2003/0217089 | A1* | 11/2003 | Bakow | G06F 9/4843 718/100 |
| 2004/0044985 | A1* | 3/2004 | Kompalli | G06F 8/20 717/100 |
| 2004/0078105 | A1* | 4/2004 | Moon | G06Q 10/10 700/100 |
| 2004/0083199 | A1* | 4/2004 | Govindugari | G06F 16/215 |
| 2005/0066304 | A1* | 3/2005 | Tattrie | G06F 8/20 717/101 |
| 2005/0262192 | A1* | 11/2005 | Mamou | G06F 16/254 709/203 |
| 2006/0104222 | A1* | 5/2006 | Xu | G06F 9/5027 370/278 |
| 2006/0143057 | A1* | 6/2006 | Sadiq | G06Q 10/06 705/7.15 |
| 2006/0282458 | A1* | 12/2006 | Tsyganskiy | G06F 8/72 |
| 2006/0288294 | A1* | 12/2006 | Bos | G06F 9/45512 715/733 |
| 2007/0168928 | A1* | 7/2007 | Yamamoto | G06F 8/10 717/104 |
| 2008/0209392 | A1* | 8/2008 | Able | G06F 8/34 717/105 |
| 2009/0178025 | A1* | 7/2009 | Morrow | G06F 8/34 717/109 |
| 2010/0145746 | A1* | 6/2010 | Gerth | G06Q 10/06 705/7.11 |
| 2011/0023009 | A1* | 1/2011 | Brunswig | G06F 9/547 717/104 |
| 2013/0304604 | A1* | 11/2013 | Hoffman | G06Q 30/0621 705/26.5 |
| 2014/0129607 | A1 | 5/2014 | Nagumo | |
| 2014/0180754 | A1* | 6/2014 | Arbogast | G06Q 10/06 705/7.27 |
| 2014/0297354 | A1* | 10/2014 | Kogiso | G06Q 9/48 705/7.26 |
| 2014/0368849 | A1* | 12/2014 | Kato | H04N 1/00278 358/1.13 |
| 2015/0095915 | A1* | 4/2015 | Nakamura | G06F 9/485 718/102 |
| 2015/0213259 | A1* | 7/2015 | Du | H04L 63/1466 726/27 |
| 2015/0220423 | A1* | 8/2015 | Kraus | G06F 11/3684 717/135 |
| 2016/0154896 | A1* | 6/2016 | Simitsis | G06F 16/2372 707/741 |
| 2016/0241724 | A1* | 8/2016 | Sugimura | H04N 1/00962 |
| 2017/0236160 | A1* | 8/2017 | Oberoi | G06Q 30/0261 705/14.66 |

FOREIGN PATENT DOCUMENTS

| | | | | |
|---|---|---|---|---|
| JP | | 5112085 | 1/2013 | |
| JP | | 2014-095986 | 5/2014 | |
| JP | | 2014-215983 | 11/2014 | |
| JP | | 2015-144014 | 8/2015 | |
| JP | | 2016-154000 | 8/2016 | |
| WO | WO-0029924 | A2* | 5/2000 | ............ G06F 9/465 |

OTHER PUBLICATIONS

Trujillo, Juan & Luján-Mora, Sergio. (2003). A UML Based Approach for Modeling ETL Processes in Data Warehouses. 2813. 307-320. 10.1007/978-3-540-39648-2_25. (Year: 2003).*
Japanese Office Action for 2016-112522 dated Feb. 12, 2020.

* cited by examiner

FIG.5A

| COMMON I/F | SUMMARY |
|---|---|
| /EXTERNAL SERVICE NAME/process/file | ACQUIRE FILE FROM SPECIFIED STORAGE SERVICE |
| /EXTERNAL SERVICE NAME/process/folder | STORE FILE IN SPECIFIED STORAGE SERVICE |
| ... | ... |

FIG.5B

| UNIQUE I/F | SUMMARY |
|---|---|
| /EXTERNAL SERVICE NAME/process/extension/attach | ADD FILE TO DOCUMENT STORED IN SPECIFIED STORAGE SERVICE |
| ... | ... |

FIG.5C

| COMMON I/F | SUMMARY |
|---|---|
| /EXTERNAL SERVICE NAME/data/files | ACQUIRE FILE LIST FROM SPECIFIED STORAGE SERVICE |
| /EXTERNAL SERVICE NAME/data/folders | ACQUIRE FOLDER LIST FROM SPECIFIED STORAGE SERVICE |
| ... | ... |

FIG.5D

| UNIQUE I/F | SUMMARY |
|---|---|
| /EXTERNAL SERVICE NAME/data/extension/images | ACQUIRE IMAGE FILE LIST FROM SPECIFIED STORAGE SERVICE |
| ... | ... |

FIG.7

| DATA FORMAT BEFORE CONVERSION | DATA FORMAT AFTER CONVERSION | FORMAT CONVERSION TO BE GENERATED |
|---|---|---|
| InputStream | LocalFilePath | FIRST FORMAT CONVERSION |
| LocalFilePath | File | SECOND FORMAT CONVERSION |
| ... | ... | ... |

```
                                                            /1100
 "flowId":"flow001",}1101
 "flowName":"CODE DELIVERY",}1102            /1103
┌─────────────────────────────────────────────────────────┐
│"flowDetails":[                                          │
│  {                                                      │
│    "detailName":"detail0",                              │
│    "component":"BARCODE RECOGNITION COMPONENT",}1111    │
│    "parameters":···                                     │
│  },                                                     │
│  {                                                      │
│    "detailName":"detail1",                              │
│    "component":"BRANCH COMPONENT",         }1112        │
│    "parameters":···                                     │
│  },                                                     │
│  {                                                      │
│    "detailName":"detail2",                              │
│    "component":"STORAGE A DELIVERY COMPONENT",}1113     │
│    "parameters":···                                     │
│  },                                                     │
│  {                                                      │
│    "detailName":"detail3",                              │
│    "component":"STORAGE B DELIVERY COMPONENT",}1114     │
│    "parameters":···                                     │
│  },                                                     │
│  {                                                      │
│    "detailName":"detail4",                              │
│    "component":"MAIL DELIVERY COMPONENT",  }1115        │
│    "parameters":···                                     │
│  }                                                      │
│],                                                       │
└─────────────────────────────────────────────/1104───────┘
┌─────────────────────────────────────────────────────────┐
│"flowConnections":[                                      │
│  {                                                      │
│    "prev":"detail0",  }1121                             │
│    "next":"detail1"                                     │
│  },                                                     │
│  {                                                      │
│    "prev":"detail1",  }1122                             │
│    "next":"detail2"                                     │
│  },                                                     │
│  {                                                      │
│    "prev":"detail1",  }1123                             │
│    "next":"detail3"                                     │
│  },                                                     │
│  {                                                      │
│    "prev":"detail2",  }1124                             │
│    "next":"detail4"                                     │
│  },                                                     │
│  {                                                      │
│    "prev":"detail3",  }1125                             │
│    "next":"detail4"                                     │
│  }                                                      │
│]                                                        │
└─────────────────────────────────────────────────────────┘
```

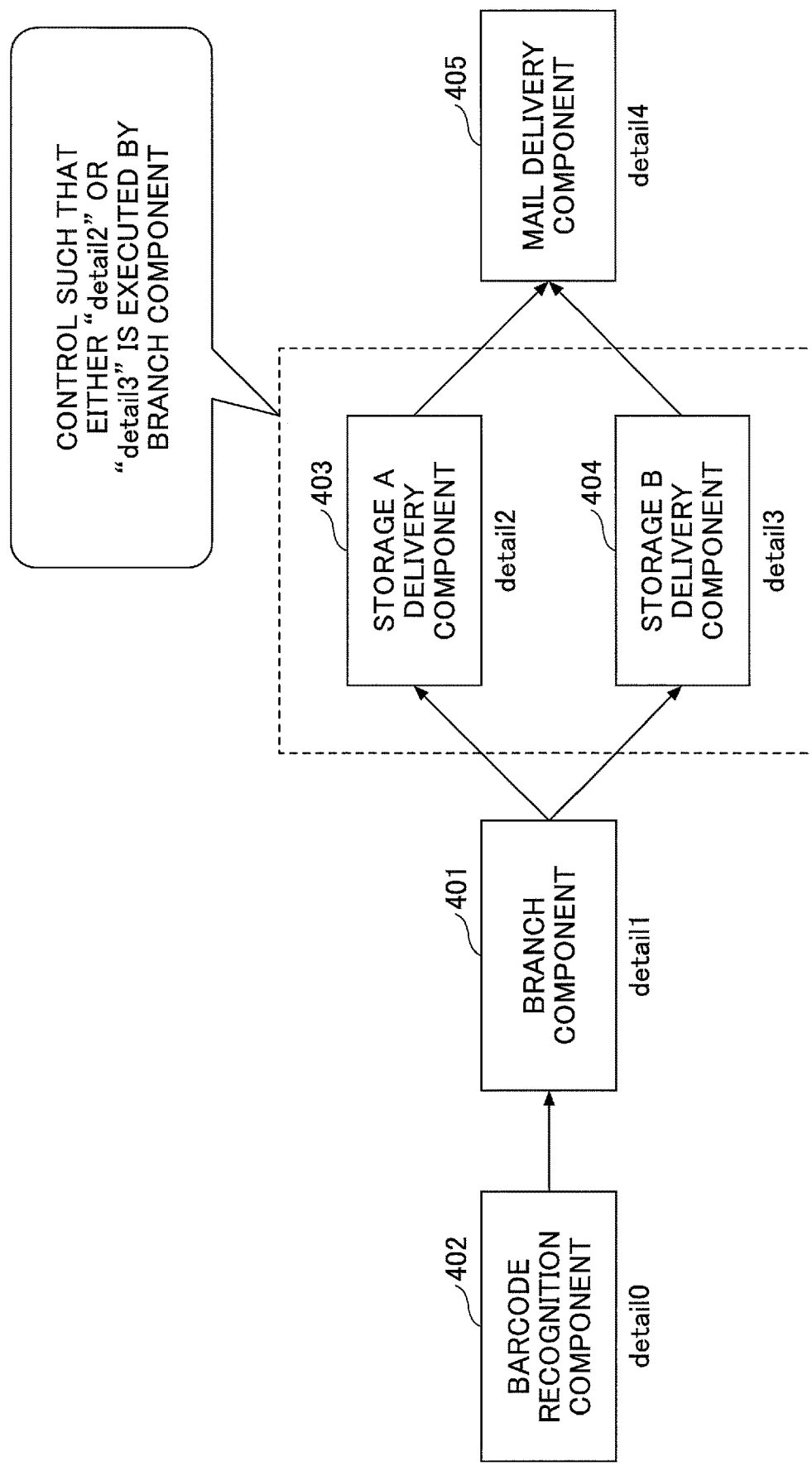

FIG.13

```
                                                  ,170D
"http":{
  ...        }171
},
                                        ,172
"parameters":[
  "detail0"{
    "skip":"false",      }1721
    "filename":"test.jpeg",
    ....
  },
  "detail1"{
    "skip":"false",
    "conditions"[
      "condition1":[
        "expressions"{
          "left":"${result.detail0.value}",
          "right":"storageA",
          "sign":"eq"
        }
        "flowdetailName":"detail3",
        "excType":"skip"
      ],
      "condition2":[
        "expressions"{
          "left":"${result.detail0.value}",
          "right":"storageB",
          "sign":"eq"
        }
        "flowdetailName":"detail2",
        "excType":"skip"
      ]
  },                                     }1722
  "detail2"{
    "skip":"false",      }1723
    ...
  },
  "detail3"{
    "skip":"false",      }1724
    ...
  },
  "detail4"{
    "skip":"false",
    "to":"hoge@fuga.com",   }1725
    ...
  }
],
"result"{   }173
}
```

FIG.15

```
"http":[
  ...
],
"parameters":[
            (SNIP)
],
"result":{
  "detail0":{
    "value":"storageA",
    ...
  }
}
```

170D

173

1731

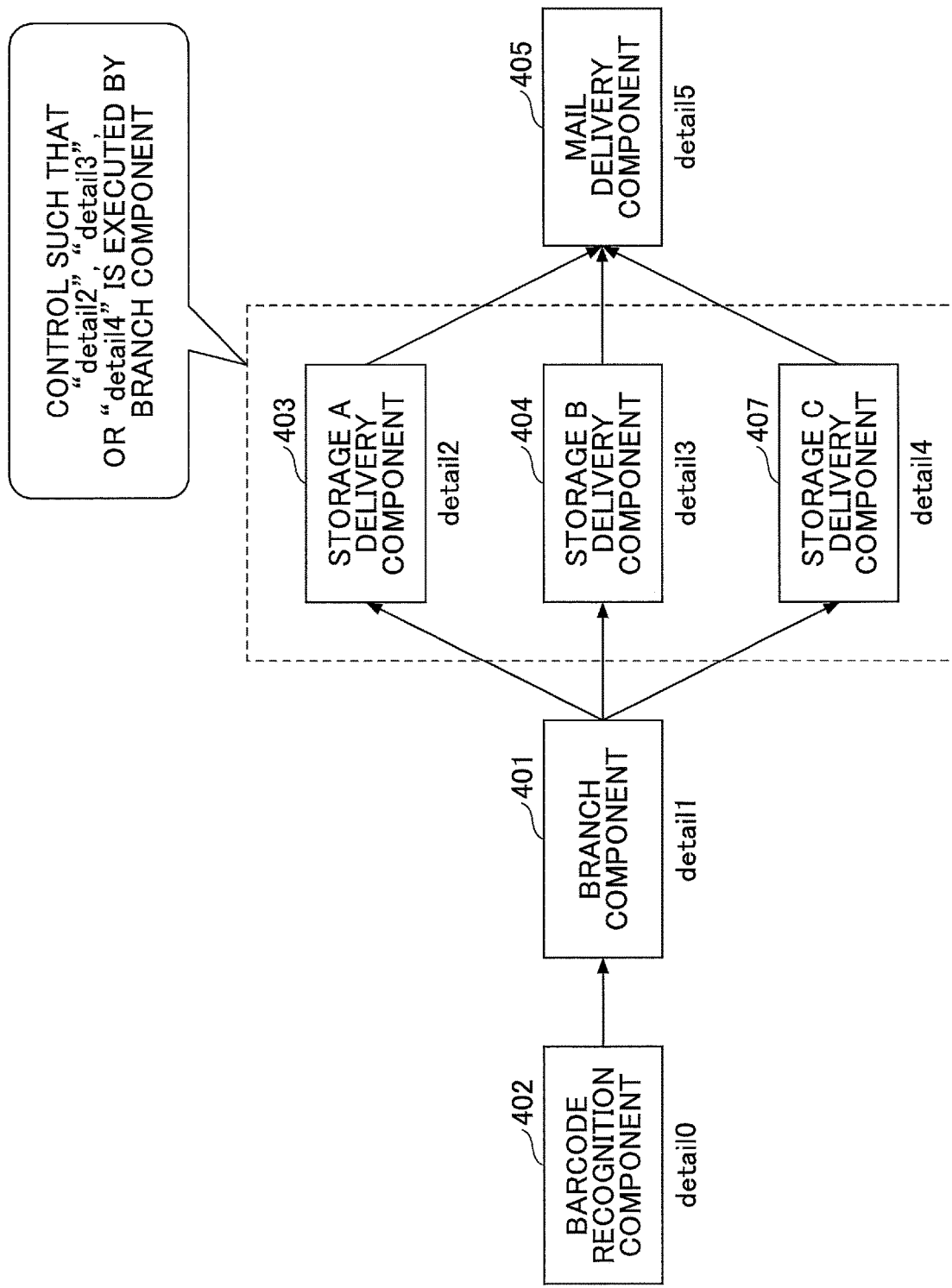

FIG.22

```
"http":{
  ...
},
"parameters":[
            (SNIP)
],
"detail1"{                                              ─1722A
   "skip":"false",
   "conditions"[
     "condition1":[
       "expressions"{
         "left":"${result.detail0.value}",
         "right":"storageA",
         "sign":"eq"
       }
       "flowdetailName":["detail3", "detail4"],
       "excType":"skip"
     ],
     "condition2":[
       "expressions"{
         "left":"${result.detail0.value}",
         "right":"storageB",
         "sign":"eq"
       }
       "flowdetailName":["detail2", "detail4"],
       "excType":"skip"
     ],
     "condition3":[
       "expressions"{
         "left":"${result.detail0.value}",
         "right":"storageC",
         "sign":"eq"
       }
       "flowdetailName":["detail2" "detail3"],
       "excType":"skip"
     ]
},
            (SNIP)
],
            (SNIP)
```

170D

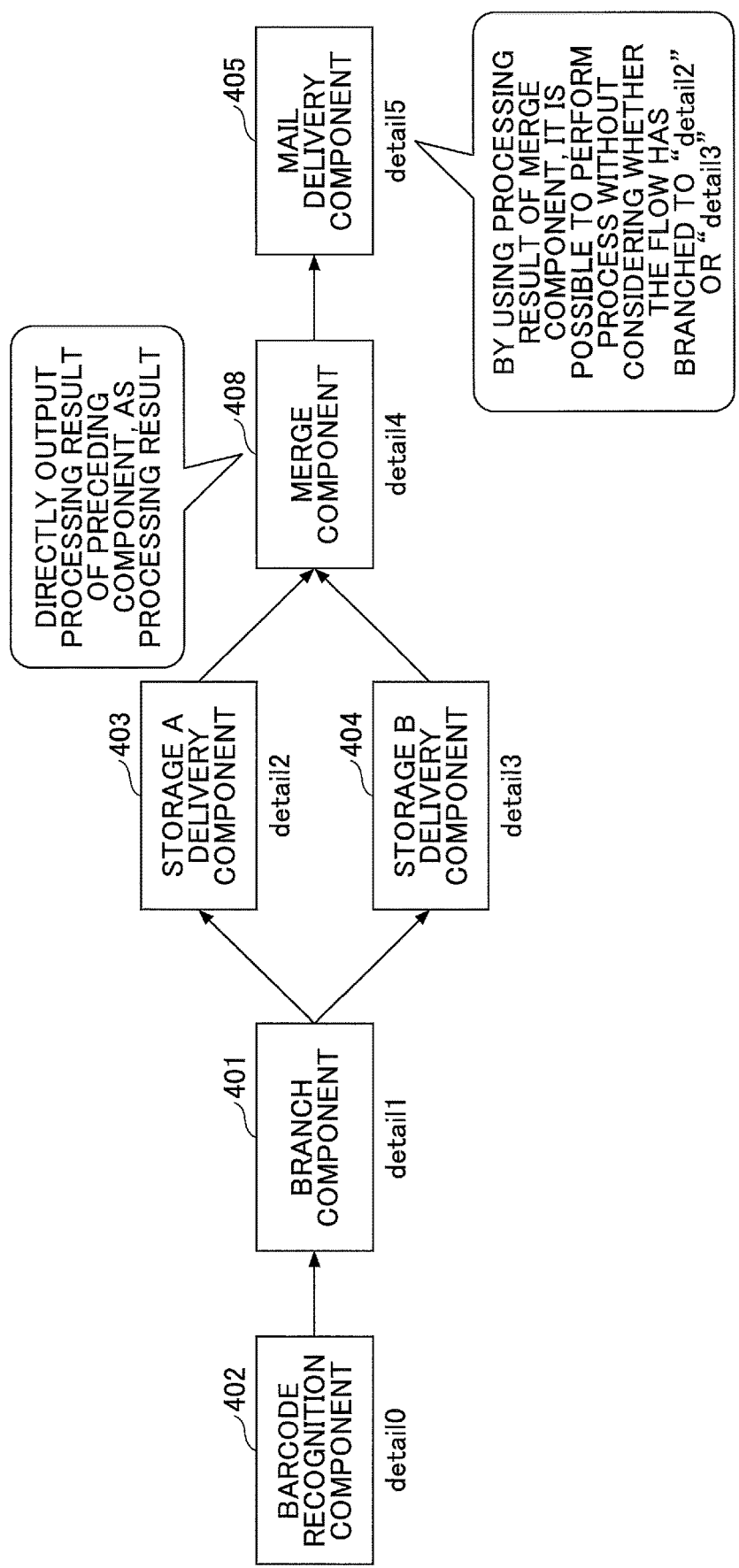

FIG.26

```
"flowId":"flow001",      }1101
"flowName":"CODE DELIVERY",   }1102
                                                              1103
"flowDetails":[
  {
    "detailName":"detail0",
    "component":"BARCODE RECOGNITION COMPONENT",  }1111
    "parameters":···
  },
  {
    "detailName":"detail1",
    "component":"BRANCH COMPONENT",                }1112
    "parameters":···
  },
  {
    "detailName":"detail2",
    "component":"STORAGE A DELIVERY COMPONENT",    }1113
    "parameters":···
  },
  {
    "detailName":"detail3",
    "component":"STORAGE B DELIVERY COMPONENT",    }1114
    "parameters":···
  },
  {
    "detailName":"detail4",
    "component":"MERGE COMPONENT",                 }1116
    "parameters":···
  },
  {
    "detailName":"detail5",
    "component":"MAIL DELIVERY COMPONENT",         }1115A
    "parameters":···
  }
],
"flowConnections":[
  (SNIP)                  }- 1104
]
```

FIG.29

```
                                        ┌─170D
  "http":[
    ...          ├─171
  ],
                                    ┌─172
  "parameters":[
    "detail0"{
      "skip":"false",        ┐
      "filename":"test.jpeg", ├─1721
      ....                   ┘
    },
    "detail1"{
      "skip":"false",
      "conditions"[
        "condition1":[
          "expressions"{
            "left":"${result.detail0.value}",
            "right":"storageA",
            "sign":"eq"
          }
          "flowdetailName":"detail3",
          "excType":"skip"           ├─1722
        ],
        "condition2":[
          "expressions"{
            "left":"${result.detail0.value}",
            "right":"storageB",
            "sign":"eq"
          }
          "flowdetailName":"detail2",
          "excType":"skip"
        ]
    },
    "detail2"{
      "skip":"false",      ├─1723
      ...
    },
    "detail3"{
      "skip":"false",      ├─1724
      ...
    },
    "detail4"{
      "skip":"false",      ├─1726
    },
    "detail5"{
      "skip":"false",
      "to":"hoge@fuga.com",
      "from": "myaddress@fuga.com",  ├─1725A
      "subject": "TEST MAIL",
      "body": "${result.detail4.url}"
    }
  ],
  "result":[
  }            ├─173
```

FIG.31A

```
"http":[
    ...
], "parameters":[
    (SNIP)
], "result":{
    "detail0":{
        "value":"storageA",
        ...
    },
    "detail2":{
        "url":"http://storageA.co.jp/fileid",  ⎫
    ]                                          ⎬ 1733
}                                              ⎭
```

FIG.31B

```
"http":[
    ...
], "parameters":[
    (SNIP)
], "result":{
    "detail0":{
        "value":"storageA",
        ...
    },
    "detail2":{
        "url":"http://storageA.co.jp/fileid",  ⎫ 1733
    ],                                         ⎭
    "detail4":{
        "url":"http://storageA.co.jp/fileid",  ⎫ 1735
    ]                                          ⎭
}
```

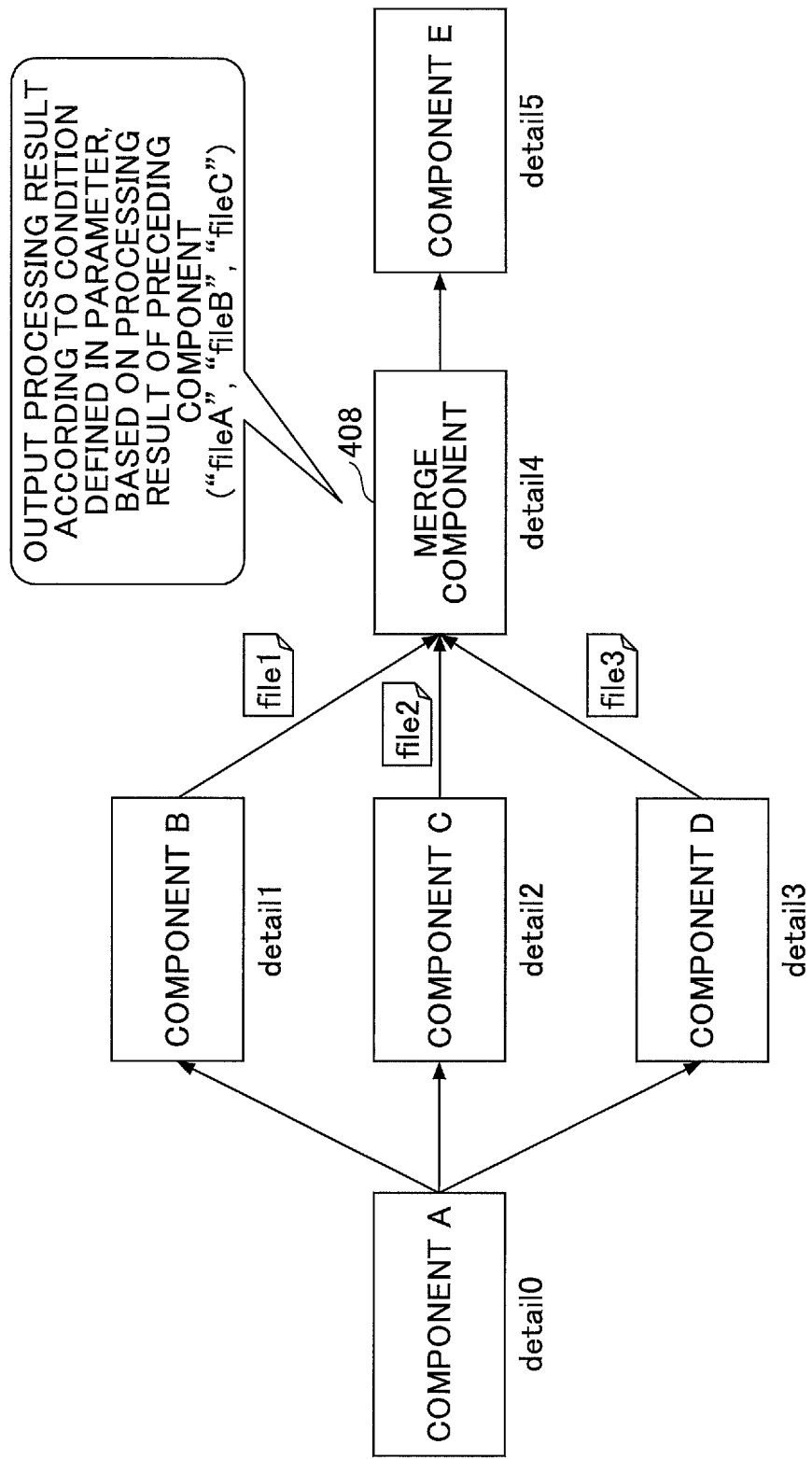

INFORMATION PROCESSING SYSTEM, INFORMATION PROCESSING APPARATUS, AND INFORMATION PROCESSING METHOD

CROSS-REFERENCE TO RELATED APPLICATION

The present application claims priority under 35 U.S.C. § 119 to Japanese Patent Application No. 2016-042844, filed on Mar. 4, 2016 and Japanese Patent Application No. 2016-112522, filed on Jun. 6, 2016, the contents of which are incorporated herein by reference in their entirety.

BACKGROUND OF THE INVENTION

1. Field of the Invention

The present invention relates to an information processing system, an information processing apparatus, and an information processing method.

2. Description of the Related Art

In recent years, various kinds of external services have been provided by cloud computing, etc. For example, there is known an external service for storing electronic data specified by a user, in an external storage, etc.

Furthermore, there is known a technology of generating an office work flow for controlling a component for executing various processes, based on an office work flow model defined in advance (see, for example, Patent Document 1). In such a technology, components are combined by the generated office work flow, and a sequence of processes for implementing an office work process is executed.

Patent Document 1: Japanese Patent No. 5112085

SUMMARY OF THE INVENTION

An aspect of the present invention provides an information processing system, an information processing apparatus, and an information processing method, in which one or more of the above-described disadvantages are reduced.

According to one aspect of the present invention, there is provided an information processing system including one or more information processing apparatuses coupled via a network configured to implement various functions of the information processing system, the information processing system including a memory configured to store flow information and flow identification information identifying the flow information in association with each other for each sequence of processes performed by using electronic data, the flow information defining program identification information identifying one or more programs for respectively executing the processes included in the sequence of processes, the flow information also defining an execution order of executing the one or more programs, and computer-executable instructions; and one or more processors configured to execute the computer-executable instructions such that the one or more processors execute a process including accepting, over a communication channel, a request including information relating to the electronic data used in the sequence of processes and the flow identification information, from one of one or more devices coupled to the information processing system; acquiring the flow information stored in the memory in association with the flow identification information included in the request, when the request is accepted; and executing the sequence of processes using the electronic data based on the information relating to the electronic data, by respectively executing the one or more programs identified by the program identification information defined in the acquired flow information, in the execution order defined in the acquired flow information, wherein when the sequence of processes includes branching, the executing includes branching the processes included in the sequence of processes according to a condition of the branching, to execute the sequence of processes.

BRIEF DESCRIPTION OF THE DRAWINGS

Other objects, features and advantages of the present invention will become more apparent from the following detailed description when read in conjunction with the accompanying drawings, in which:

FIGS. 5A through 5D illustrate examples of a common interface (I/F) and a unique I/F according to the first embodiment of the present invention;

FIG. 7 illustrates an example of a format conversion information table according to the first embodiment of the present invention;

FIG. 8 illustrates an example of process flow information according to the first embodiment of the present invention;

FIG. 9 is a diagram for describing an example of a process flow for implementing a "code delivery" service according to the first embodiment of the present invention;

FIG. 13 illustrates an example of resource management information according to the first embodiment of the present invention;

FIG. 15 illustrates an example of resource management information in which the processing result of the barcode recognition component is stored according to the first embodiment of the present invention;

FIG. 21 is a diagram for describing another example of a process flow (part 2) according to the first embodiment of the present invention;

FIG. 22 illustrates another example of the resource management information according to the first embodiment of the present invention;

FIG. 25 is a diagram for describing another example of a process flow for implementing the "code delivery" service according to the second embodiment of the present invention;

FIG. 26 illustrates another example of the process flow information according to the second embodiment of the present invention;

FIG. 29 illustrates an example of the resource management information according to the second embodiment of the present invention;

FIGS. 31A and 31B are for describing examples of storing the processing result of the merge component in the resource management information according to the second embodiment of the present invention; and FIG. 32 is a diagram for describing another example of a process flow (part 3) according to the second embodiment of the present invention.

DETAILED DESCRIPTION OF THE PREFERRED EMBODIMENTS

In the technology of the related art, when the sequence of processes includes an operation of branching a process, there have been cases where the sequence of processes cannot be executed. For example, when the processing result of a certain component becomes the input of the next component, it has not been possible to dynamically change the next component, according to a processing result of the certain component.

A problem to be solved by an embodiment of the present invention is to execute a sequence of processes including branching.

Embodiments of the present invention will be described by referring to the accompanying drawings.

First Embodiment

<System Configuration>

Figure 1:
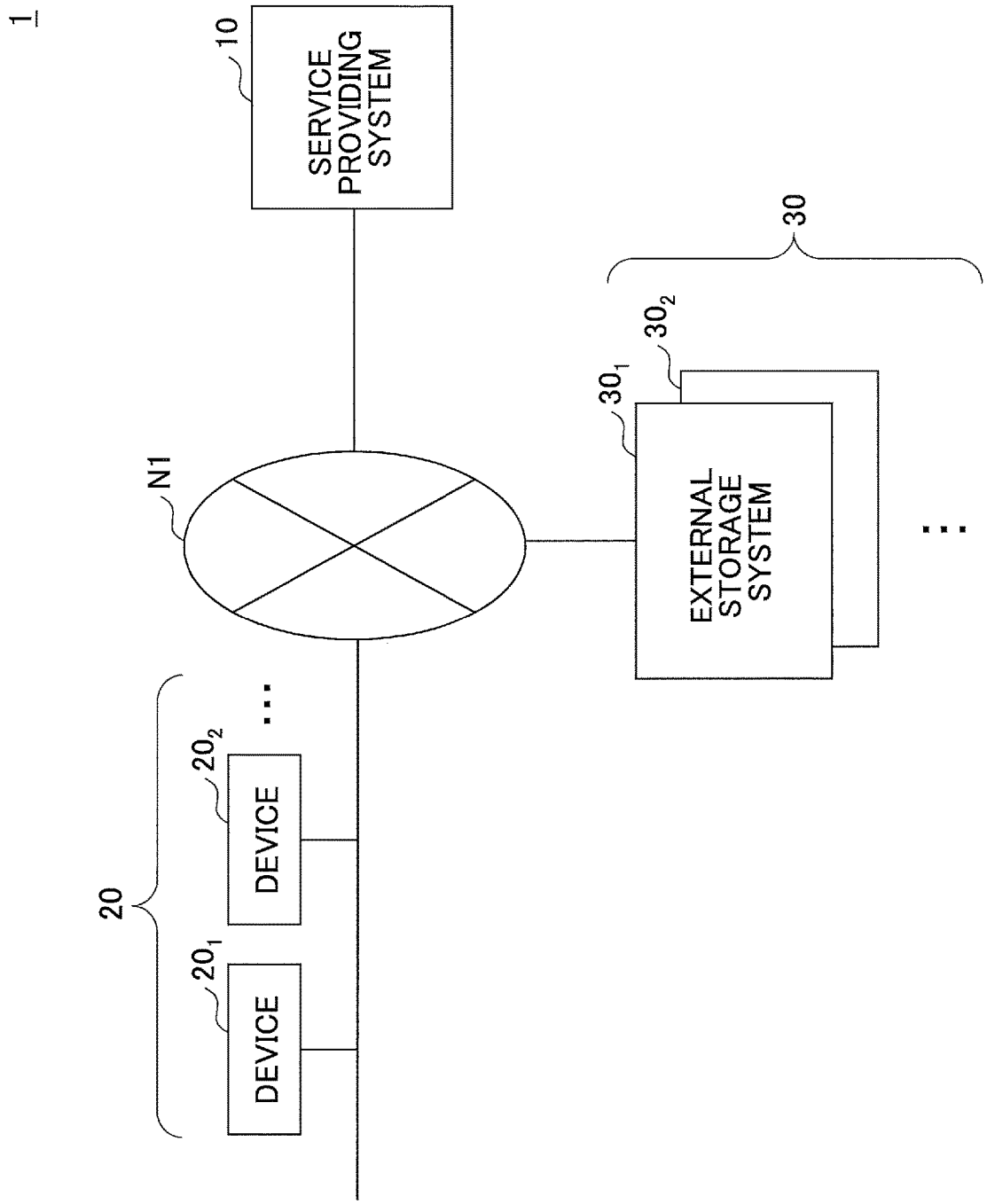
FIG. 1 is a diagram illustrating an exemplary system configuration of an information processing system according to a first embodiment of the present invention.

Referring to FIG. 1, an information processing system 1 according to the first embodiment is described. FIG. 1 is a diagram illustrating an exemplary system configuration of the information processing system 1 according to the first embodiment.

The information processing system 1 illustrated in FIG. 1 includes a service providing system 10, a device 20, and an external storage system 30, which are communicably coupled through a wide area network N1 such as the Internet.

The service providing system 10 is implemented by at least one information processing apparatus and provides various services, which cooperate with an external service such as cloud service via the network N1. Specific examples of services provided by the service providing system 10 according to the present embodiment are described below.

Although the external service to be described in the first embodiment is specifically the cloud service, the external service is not limited to this cloud service. For example, the first embodiment may be applied to various external services such as a service provided by an application service provider (ASP) and a web service, which are provided via the network.

The devices 20 are various electronic devices used by a user. That is, the device 20 is, for example, an image forming apparatus such as a multifunction peripheral (MFP), a personal computer (PC), a projector, an electronic whiteboard, a digital camera, or the like. The user uses the device 20 to use various services provided by the service providing system 10.

Hereinafter, when each of the plurality of devices 20 is distinguished, a suffix is added such as a "device $20_1$" and a "device $20_2$".

The external storage system 30 is a computer system providing a cloud service called a storage service (or an online storage). The storage service is a service of lending a memory area of a storage of the external storage system 30.

Hereinafter, when each of the plurality of external storage systems 30 is distinguished, a suffix is added such as an "external storage system $30_1$" and an "external storage system $30_2$". Further, the name of the storage service provided by the external storage system $30_1$ is a "storageA", and the name of the storage service provided by the external storage system $30_2$ is a "storage B".

The external storage system 30 may be a system implemented by a plurality of information processing apparatuses.

The configuration of the information processing system 1 illustrated in FIG. 1 is an example and may have other configurations. For example, the information processing system 1 according to the first embodiment includes various devices, each of which performs at least one of an input and an output of the electronic data. These devices may use various services provided by the service providing system 10.

<Hardware Configuration>

Figure 2:
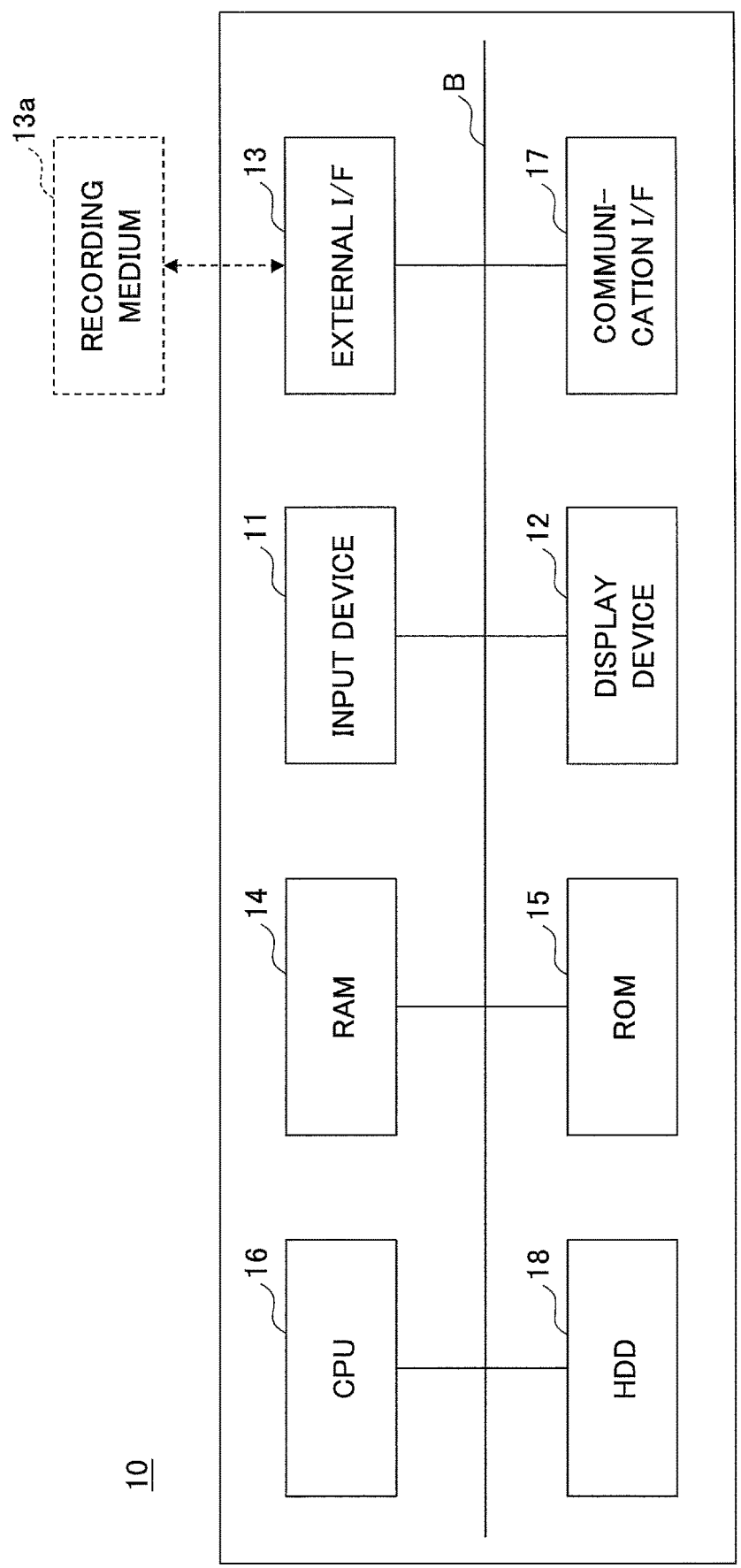
FIG. 2 is a diagram illustrating a hardware configuration of an exemplary service providing system according to the first embodiment of the present invention.

Referring to FIG. 2, described next is the hardware configuration of the service providing system 10 included in the information processing system 1 according to the first embodiment. FIG. 2 is a diagram illustrating the hardware configuration of an exemplary service providing system 10 according to the first embodiment.

The service providing system 10 illustrated in FIG. 2 includes an input device 11, a display device 12, an external interface (I/F) 13, and a random access memory (RAM) 14.

Further, the service providing system 10 includes a read only memory (ROM) 15, a central processing unit (CPU) 16 (an example of one or more processors), a communication interface (I/F) 17, and a hard disk drive (HDD) 18. Each of the ROM 15, the CPU 16, a communication I/F 17, and the HDD 18 is connected by the bus B.

The input device 11 includes a keyboard, a mouse, a touch panel, and the like, by which the user inputs various operation signals. The display device 12 includes a display or the like to display a processing result acquired by the service providing system 10. At least one of the input device 11 and the display device 12 may be in a mode of being coupled to the service providing system 10 so as to be used.

The communication I/F 17 is an interface provided to couple the service providing system 10 with the network N1. Thus, the service providing system 10 can communicate with another device through the communication I/F 17.

The HDD 18 is a non-volatile memory device that stores programs and data. The program and data stored in the HDD 18 are an operating system (OS), which is basic software controlling the entire service providing system 10, application software providing various functions in the OS, and so on.

The service providing system 10 may use a drive device (e.g., a solid state drive (SSD)) using a flash memory as a memory medium in place of the HDD 18. Further, the HDD 18 administers the stored program and the stored data using at least one of a predetermined file system and a predetermined database (DB).

The external I/F 13 is an interface with an external device. The external device includes a recording medium 13a and so on. With this, the service providing system 10 can read information from the recording medium 13a and write information to the recording medium 13a through the external I/F 13. The recording medium 13a is a flexible disk, a CD, a DVD, an SD memory card, a USB memory, or the like.

The ROM 15 is a non-volatile semiconductor memory that can store a program or data even when a power source is powered off. The ROM 15 stores a program and data such as a basic input/output system (BIOS), an operating system (OS) setup, a network setup, or the like, which are executed at a time of starting up the service providing system 10. The RAM 14 is a volatile semiconductor memory configured to temporarily store the program and the data.

The CPU 16 reads the program and/or data from the memory device such as the ROM 15 and the HDD 18. The read program or the read data undergo a process to thereby realize a control or a function of the entire service providing system 10.

The service providing system 10 of this embodiment can realize various processes described below by having the above hardware configuration of the service providing system 10 illustrated in FIG. 2.

Figure 3:
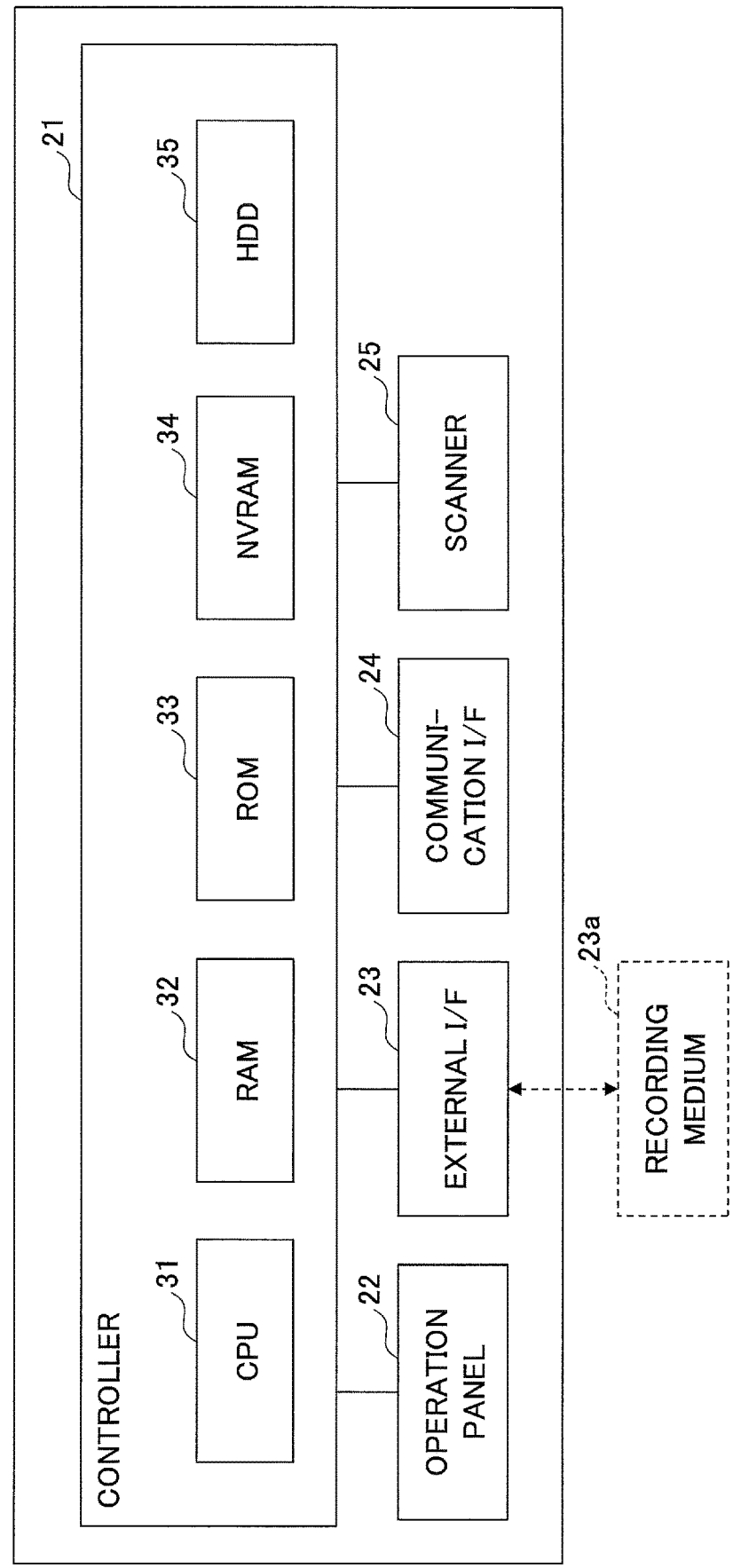
FIG. 3 is a diagram illustrating a hardware configuration of an exemplary device according to the first embodiment of the present invention.

Referring to FIG. 3, described next is the hardware configuration of an image forming apparatus, which is the device 20 included in the information processing system 1 of the embodiment. FIG. 3 is a diagram illustrating a hardware configuration of an exemplary device 20 according to the first embodiment.

The device 20 illustrated in FIG. 3 includes a controller 21, an operation panel 22, an external interface (I/F) 23, a communication I/F 24, and a scanner 25. The controller 21 includes a central processing unit (CPU) 31 (an example of one or more processors), a random access memory (RAM) 32, a read only memory (ROM) 33, a non-volatile random access memory (NVRAM) 34, and a hard disk drive (HDD) 35.

The ROM 33 is a non-volatile semiconductor memory that stores various programs and data. The RAM 32 is a volatile semiconductor memory configured to temporarily store the program and the data. For example, setup information or the like is stored in the NVRAM 34. The HDD 35 is a non-volatile memory device that stores the various programs and data.

The CPU 31 reads the program, the data, setup information, or the like into the RAM 32 from the ROM 33, the NVRAM 34, the HDD 35, or the like, and executes the process. Thus, the CPU 31 is an arithmetic device implementing control and a function of the entire device 20.

The operation panel 22 includes an input unit configured to receive an input from the user and a display unit configured to display. The external I/F 23 is an interface with the external device. The external device includes a recording medium 23a and so on. With this, the device 20 can perform at least one of reading information from the recording medium 23a through the external I/F 23 and writing the information to the recording medium 23a through the external I/F 23. The recording medium 23a is, for example, an IC card, a flexible disk, a compact disc (CD), a digital versatile disc (DVD), a secure digital (SD) memory card, and a universal serial bus (USB) memory.

The communication I/F 24 is an interface coupling the device 20 with the network N1. Thus, the device 20 can perform data communications through the communication I/F 24. The scanner 25 is a reading device that reads an original and generates an electronic file (an image file).

The device 20 according to the first embodiment includes a hardware configuration illustrated in FIG. 3 to realize various processes described below.

<Service Provided by Service Providing System>

The service provided by the service providing system 10 according to the first embodiment is described. Hereinafter, a description is given of a case where the device 20 is an image forming apparatus.

In the service providing system 10 according to the present embodiment, a barcode, which is included in an electronic file generated by scanning an original document at the device 20, is read according to a barcode recognition process. Subsequently, the service providing system 10 according to the present embodiment provides a service of storing the electronic file in the external storage system 30 according to the recognition result of the recognition process, and delivering the storage destination Uniform Resource Locator (URL) by mail.

The service providing system 10 according to the present embodiment is described as providing the above-described service (in the following, also referred to as an "code delivery" service, or simply as "code delivery").

However, the service provided by the service providing system 10 is not limited to the above. For example, the service providing system 10 may provide a service of reading a Quick Response (QR) code (registered trademark) included in an electronic file by a QR code recognition process, and storing the electronic file in the external storage system 30 according to the recognition result of the recognition process.

Furthermore, for example, the service providing system 10 may provide a service of reading, by a barcode recognition process, the barcode included in an electronic file, which has been acquired (downloaded) from the external storage system 30, and printing the electronic file with the device 20 according to the recognition result of the recognition process.

Note that in the "code delivery" service provided by the service providing system 10 according to the present embodiment, an electronic file, which has been scanned and generated at the device 20, is stored (uploaded) in a storage area lent out by the external storage system 30.

<Functional Configuration (First Embodiment)>

Figure 4:
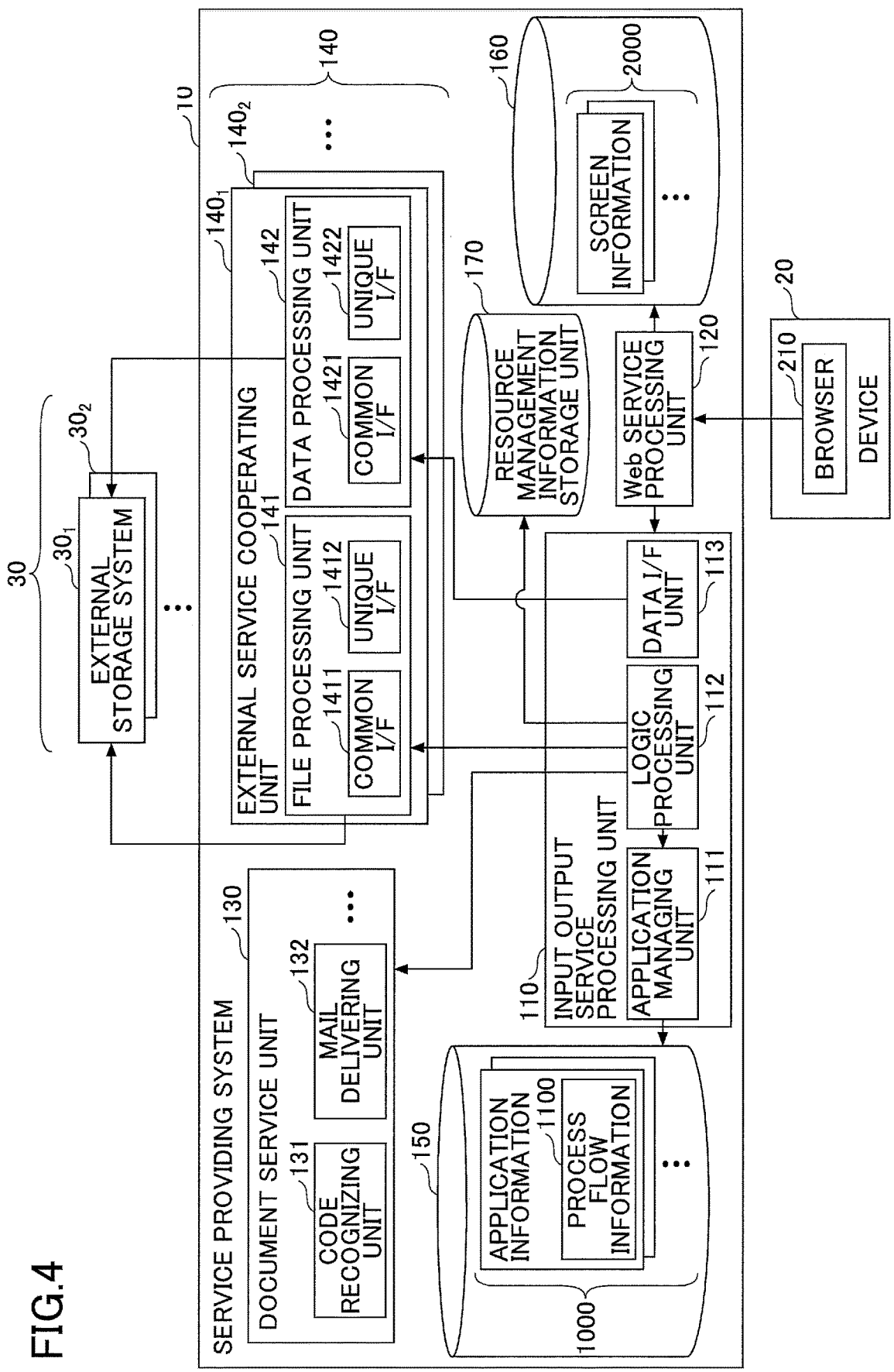
FIG. 4 illustrates a functional configuration of an example of the information processing system according to the first embodiment of the present invention.

Next, a description is given of a functional configuration of the information processing system 1 according to the present embodiment, by referring to FIG. 4. FIG. 4 illustrates a functional configuration of an example of the information processing system 1 according to the present embodiment.

The device 20 illustrated in FIG. 4 includes a browser 210 executed by, for example, the CPU 31, etc. The user of the device 20 is able to use a service provided by the service providing system 10, via the browser 210. In this way, the device 20 according to the present embodiment can function by having the browser 210 installed.

The service providing system 10 illustrated in FIG. 4 includes an input output service processing unit 110, a web service processing unit 120, a document service unit 130, and an external service cooperating unit 140. These units are implemented by a process that the CPU 16 is caused to execute by one or more programs installed in the service providing system 10.

Furthermore, the service providing system 10 illustrated in FIG. 4 includes an application information storage unit 150, a screen information storage unit 160, and a resource management information storage unit 170. These storage units can be realized by the HDD 18. Note that at least one storage unit among the application information storage unit 150, the screen information storage unit 160, and the resource management information storage unit 170 may be realized by a storage device, etc., that is coupled to the service providing system 10 via a network N1.

The input output service processing unit 110 performs a process relevant to a service provided by the service providing system 10. Here, the input output service processing unit 110 includes an application managing unit 111, a logic processing unit 112, and a data I/F unit 113.

The application managing unit 111 manages application information 1000 stored in the application information storage unit 150. Note that the application information 1000 is an application for providing various services. That is, the various services provided by the service providing system 10 are provided according to the application information 1000.

Furthermore, the application managing unit 111 returns process flow information 1100 included in the application information 1000, in response to a request from the logic processing unit 112. Note that the process flow information 1100 is information defining a sequence of processes (hereinafter, a sequence of processes is also referred to as a "process flow") for implementing a service provided by the application information 1000.

The logic processing unit 112 acquires the process flow information 1100 from the application managing unit 111, in response to a request from the web service processing unit 120. Then, the logic processing unit 112 executes a process flow for implementing a service, based on the acquired process flow information 1100. Accordingly, in the information processing system 1 according to the present embodiment, various services are provided by the service providing system 10. Note that details of the logic processing unit 112 are described below.

The data I/F unit 113 makes various requests to a data processing unit 142 of the external service cooperating unit 140, in response to a request from the web service processing unit 120. For example, the data I/F unit 113 makes a request to acquire a folder list, to the data processing unit 142 of the external service cooperating unit 140.

The web service processing unit 120 returns screen information 2000 stored in the screen information storage unit 160, in response to a request from the browser 210. Note that the screen information 2000 is information defining a screen to be displayed on the browser 210, and is defined in a format of, for example, HyperText Markup Language (HTML) and Cascading Style Sheets (CSS).

Accordingly, on the operation panel 22 of the device 20, a service list screen for selecting a service provided by the service providing system 10, and a service screen for using a service, etc., are displayed by the browser 210.

Furthermore, the web service processing unit 120 makes various requests to the input output service processing unit 110, in response to a request from the browser 210. For example, the web service processing unit 120 makes a request to execute a process flow for implementing the "code delivery" service to the logic processing unit 112 of the input output service processing unit 110, in response to a request from the browser 210.

The document service unit 130 executes processes included in a sequence of processes (process flow) based on the process flow information 1100. Here, the document service unit 130 includes a code recognizing unit 131 and a mail delivering unit 132.

The code recognizing unit 131 reads a predetermined code (for example, a barcode and a QR code (registered trademark)) included in an electronic file by a code recognition process, and acquires a recognition result. Note that a recognition result is, for example, information (for example, a character string including alphanumeric characters and symbols, etc.) acquired by reading a barcode and a QR code, etc.

The mail delivering unit 132 creates a mail to which an electronic file is attached, and delivers the mail to a specified mail address.

Note that the document service unit 130 may also include, for example, a data converting unit for converting data format of the electronic file into a predetermined data format, and a compression/decompression processing unit for compressing or decompressing the electronic file.

As described above, the document service unit 130 includes various functional units for executing processes included in a sequence of processes (process flow). Therefore, the document service unit 130 is realized by a group of programs (modules) for providing the various functions.

The external service cooperating unit 140 makes various requests to the external storage system 30, in response to a request from the logic processing unit 112 and the data I/F unit 113.

The service providing system 10 according to the present embodiment includes the external service cooperating unit 140 corresponding to each external storage system 30. That is, the service providing system 10 includes the external service cooperating unit $140_1$ for making various requests to the external storage system $30_1$, and the external service cooperating unit $140_2$ for making various requests to the external storage system $30_2$, etc.

As described above, the service providing system 10 according to the present embodiment includes the external service cooperating unit 140 corresponding to each external storage system 30 for performing a process in cooperation with the service providing system 10. Note that in the following, when each of the plurality of external service cooperating units 140 is distinguished, a suffix is added such as the "external service cooperating unit 140$_1$" and the "external service cooperating unit 140$_2$".

Here, the external service cooperating unit 140 includes a file processing unit 141 for receiving a request from the logic processing unit 112 and the data processing unit 142 for receiving a request from the data I/F unit 113.

The file processing unit 141 includes a common I/F 1411 and a unique I/F 1412, in which an application programming interface (API) for conducting a file operation (e.g., an acquisition operation, a storage operation, and an edit operation) to the electronic file stored in the external storage system 30, is defined.

The common I/F 1411 is an API commonly used among the plurality of external storage systems 30 as, for example, the API illustrated in FIG. 5A. That is, the common I/F 1411 of the file processing unit 141 is a group of APIs for using a function (e.g., a file acquisition function, and a file storage function) related to the file operation which can be used by all of the external storage systems 30.

The unique I/F 1412 is an API used by a specific external storage system 30 as, for example, the API illustrated in FIG. 5B. That is, the unique I/F 1412 of the file processing unit 141 is an API group of APIs for using a function (e.g., an editing function of an electronic file) related to the file operation that can be used in the specific external storage system 30.

Therefore, the common I/F 1411 is similarly defined for all the external service cooperating units 140. On the other hand, the unique I/F 1412 is defined for the external service cooperating unit 140 corresponding to the specific external storage system 30, in which the API defined by the unique I/F 1412 can be used.

On the other hand, the data processing unit 142 includes a common I/F 1421 and a unique I/F 1422, in which an API for acquiring meta data (e.g., a file list and a folder list) of bibliographic information of the electronic file stored in the external storage system 30 is defined.

The common I/F 1421 is an API commonly used among the plurality of external storage systems 30 as, for example, the API illustrated in FIG. 5C. That is, the common I/F 1421 of the data processing unit 142 is an API group of APIs for using a function (e.g., a function of acquiring a list of files and a list of folders) related to meta data acquisition that can be used by all the external storage systems 30.

The unique I/F 1422 is an API, which can be used by the specific external storage system 30, such as the API illustrated in FIG. 5D. That is, the unique I/F 1422 of the data processing unit 142 is an API group of APIs for using a function (e.g., a function of acquiring a list of image files), which is related to acquisition of metadata that can be used by the specific external storage system 30.

Therefore, the common I/F 1421 is similarly defined for all the external service cooperating units 140. On the other hand, the unique I/F 1422 is defined for the external service cooperating unit 140 corresponding to the specific external storage system 30, in which the API defined by the unique I/F 1422 can be used.

As described above, the service providing system 10 according to the present embodiment includes the external service cooperating units 140 respectively corresponding to the external storage systems 30, which respectively perform processes in cooperation with the service providing system 10. Therefore, in a case where the external storage system 30 to be the cooperation destination of the service providing system 10 is added or deleted (hereinafter, referred to as an "addition, etc."), the external service cooperating unit 140 corresponding to the external storage system 30 is to be added, etc., to the service providing system 10.

Therefore, in the service providing system 10 according to the first embodiment, the influence caused by the addition, etc., of the external storage system 30, which is to be the cooperation destination, can be localized. That is, in the service providing system 10 according to the present embodiment, the addition, etc., of the external storage system 30, which is to be the cooperation destination, can be done without influencing the other functional units (i.e., the input output service processing unit 110 and the web service processing unit 120, etc.).

Therefore, in the service providing system 10 according to the present embodiment, it is possible to reduce the development labor hours in the case of performing the addition, etc., of the external storage system 30 that is the cooperation destination of the service providing system 10. Note that the addition, etc., of the external service cooperating unit 140 may be performed by using a Software Development Kit (SDK).

Furthermore, the external service cooperating unit. 140 realizes the common I/F 1411 and the unique I/F 1412 by different modules, etc. Furthermore, the API defined by the common I/F 1411 and the unique I/F 1412 may be used by specifying an external service name (name of a storage service).

Therefore, in the service providing system 10 according to the present embodiment, when adding the external storage system 30 to be the cooperation destination of the service providing system 10, the common I/F 1411 included in another external service cooperating unit 140 can be reused. That is, when adding the external storage system 30 to be the cooperation destination, only the unique I/F 1412 needs to be developed. Accordingly, in the service providing system 10 according to the present embodiment, the development labor hours when adding the external storage system 30 to be the cooperation destination can be further reduced. Note that the same applies with respect to the common I/F 1421 and the unique I/F 1422.

The application information storage unit 150 stores the application information 1000. The application information 1000 is stored in the application information storage unit 150, in association with an application ID for uniquely identifying the application information 1000 (application).

Here, the application information 1000 includes the process flow information 1100. For example, the application information 1000 for providing the "code delivery" service includes the process flow information 1100 in which a sequence of processes for implementing this service is defined.

Note that the application information 1000 may include two or more process flow information items 1100. For example, the application information 1000 providing the "code delivery" service may include process flow information 1100A for performing a barcode recognition process and storing the electronic file, and process flow information 1100B for performing a QR code recognition process and storing the electronic file.

As described above, the process flow information 1100 is information defining a sequence of processes (process flow) for implementing a service provided by the application information 1000. Note that details of the process flow information 1100 are described below.

The screen information storage unit 160 stores the screen information 2000. As described above, the screen information 2000 is information defining a screen to be displayed on the browser 210. Note that the screen information 2000 of a service screen for using a service provided by the application information 1000, is stored in the screen information storage unit 160, in association with an application ID of the application information 1000.

The resource management information storage unit 170 stores resource management information 170D for managing parameters used in a sequence of processes and the processing results, etc., of the processes included in the sequence of processes, based on the process flow information 1100. Note that details of the resource management information 170D are described below.

Figure 6:
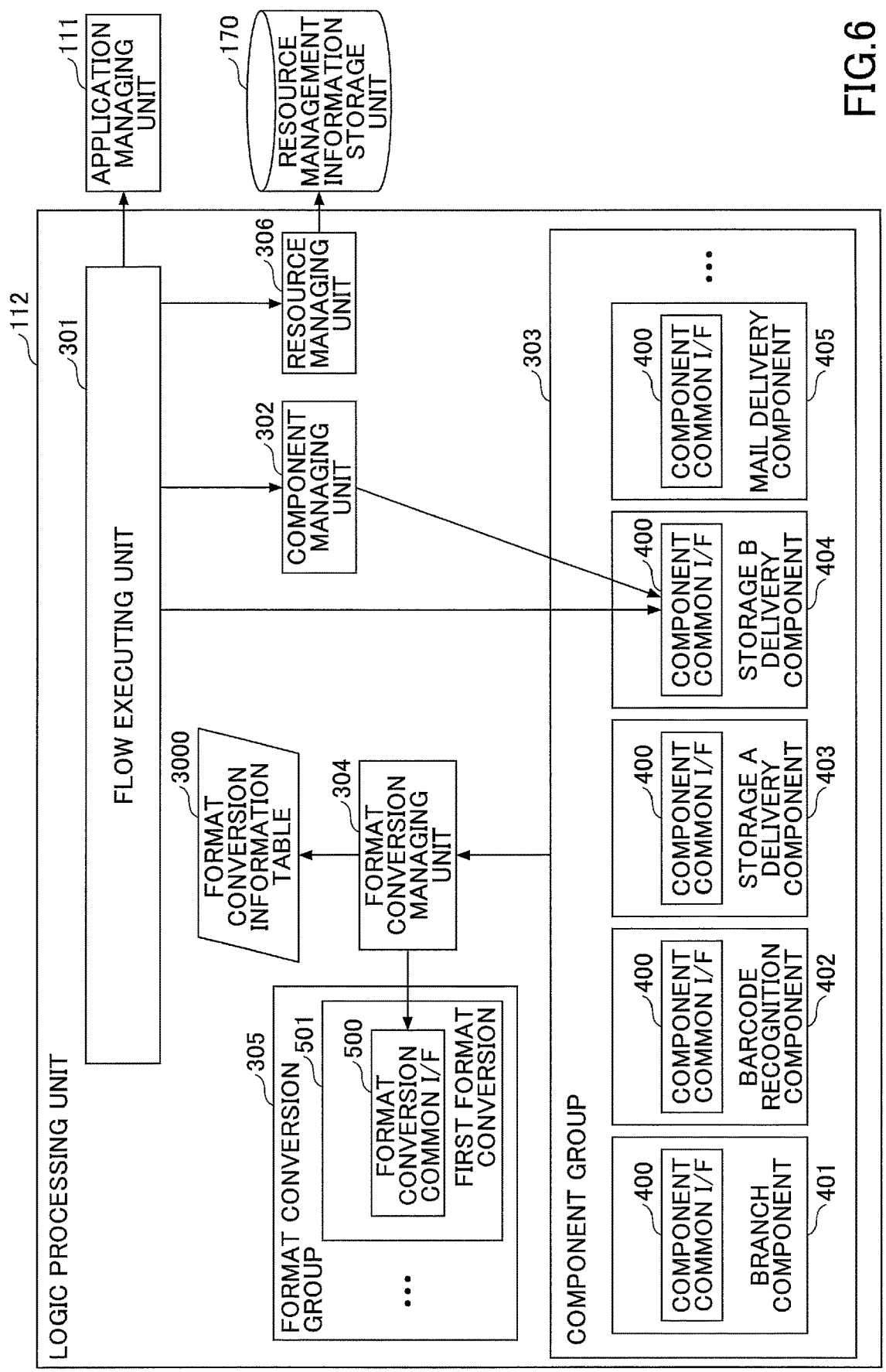
FIG. 6 illustrates an example of a functional configuration of a logic processing unit according to the first embodiment of the present invention.

Here, a description is given of details of the functional configuration of the logic processing unit 112, by referring to FIG. 6. FIG. 6 illustrates an example of a functional configuration of the logic processing unit 112 according to the present embodiment.

The logic processing unit 112 illustrated in FIG. 6 includes a flow executing unit 301, a component managing unit 302, a component group 303, a format conversion managing unit 304, a format conversion group 305, and a resource managing unit 306. Furthermore, the logic processing unit 112 includes a format conversion information table 3000.

When the flow executing unit 301 receives a process execution request from the browser 210 via the web service processing unit 120, the flow executing unit 301 acquires, from the application managing unit 111, the process flow information 1100 included in the application information 1000. Then, the flow executing unit 301 executes a sequence of processes (process flow) based on the acquired process flow information 1100.

Here, a sequence of processes based on the process flow information 1100 is executed by combining components for executing the processes included in the sequence of processes. Note that a component is implemented by programs and modules, etc., for providing predetermined functions, and is defined by, for example, a class and a function, etc.

Furthermore, when the flow executing unit 301 acquires the process flow information 1100, the flow executing unit 301 stores the parameters, etc., included in the process flow information 1100, as the resource management information 170D in the resource management information storage unit 170, via the resource managing unit 306.

Note that parameters are various kinds of information used by components for executing the processes included in the sequence of processes.

The component managing unit 302 manages components. The component managing unit 302 generates a component and returns the generated component to the flow executing unit 301, in response to a request from the flow executing unit 301. Note that generating a component means loading a component defined by, for example, a class and a function, etc., in a memory (for example, the RAM 14).

The component group 303 is an assembly of components. The component group 303 includes a branch component 401, a barcode recognition component 402, a storage A delivery component 403, a storage B delivery component 404, and a mail delivery component 405.

The branch component 401 is a component for controlling the branching of a process included in a process flow. The barcode recognition component 402 is a component for performing a process of recognizing a barcode included in an electronic file.

The storage A delivery component 403 is a component for storing (uploading) the electronic file in the external storage system $30_1$ (storage A). The storage B delivery component 404 is a component for storing (uploading) the electronic file in the external storage system $30_2$ (storage B). The mail delivery component 405 is a component for delivering a mail to a specified mail address.

Note that the component group 303 also includes various components such as a component for performing Optical Character Recognition (OCR) on an electronic file, and a compression component for compressing an electronic file, etc., other than the above components.

Furthermore, each component included in the component group 303 includes a component common I/F 400. The component common I/F 400 is an API that is commonly defined for the components, and includes an API for generating a component and an API for requesting to execute a process of the component.

As described above, the components include the component common I/F 400, and therefore the influence caused by the addition, etc., of a component can be localized. That is, for example, the addition, etc., of a component can be performed without influencing the flow executing unit 301 or the component managing unit 302, etc. Accordingly, in the service providing system 10 according to the present embodiment, the development labor hours associated with the addition, etc., of a predetermined function, etc., (that is, the addition, etc., of a component for executing processes for implementing the function) can be reduced.

Note that, for example, the component managing unit 302 may generate each component included in the component group 303 by the component common I/F 400, when the service providing system 10 is activated.

The format conversion managing unit 304 manages the format conversion of the data format. Here, the data format that each component can handle is defined in advance. Therefore, in response to a request from a component, the format conversion managing unit 304 refers to the format conversion information table 3000, for example, as illustrated in FIG. 7, and generates a format conversion to be included in the format conversion group 305.

Then, the format conversion managing unit 304 requests the generated format conversion to execute a format conversion process. Note that format conversion is a program and a module, etc. for executing a format conversion process of converting the data format, and is defined by, for example, a class and a function, etc. Furthermore, the generation of format conversion means, for example, to load the format conversion defined by a class, in a memory (for example, the RAM 14).

Note that examples of data formats are a data format "InputStream" indicating stream data, "LocalFilePath" indicating the path (address) of the electronic file stored in a storage device, etc., and "File" indicating the entity of an electronic file, etc.

Here, a description is given of the format conversion information table 3000, by referring to FIG. 7. FIG. 7 illustrates an example of the format conversion information table 3000.

The format conversion information table 3000 illustrated in FIG. 7 includes the data items of a data format before conversion, a data format after conversion, and a conversion format conversion to be generated. That is, the format conversion information stored in the format conversion information table 3000 is information in which a format conversion, which is for converting a data format before conversion into a data format after conversion, is associated with each data format before conversion and each data format after conversion.

The format conversion group 305 is an assembly of format conversions. The format conversion group 305 includes a first format conversion 501 for converting the data format "InputStream" into "LocalFilePath". Note that the format conversion group 305 also includes a second format conversion for converting the data format "LocalFilePath" into "File", etc.

Furthermore, each format conversion included in the format conversion group 305 includes a format conversion common I/F 500. The format conversion common I/F 500 is an API that is commonly defined for the format conversions. The format conversion common I/F 500 includes an API for generating a format conversion and an API for executing a format conversion process of the format conversion.

As described above, each format conversion includes the format conversion common I/F 500, and therefore the influence caused by the addition, etc., of a format conversion can be localized. That is, for example, the addition, etc., of a format conversion can be performed without influencing the format conversion managing unit 304, etc. Accordingly, in the service providing system 10 according to the present embodiment, the development labor hours associated with the addition, etc., of a format conversion can be reduced.

The resource managing unit 306 manages the resource management information 170D stored in the resource management information storage unit 170. That is, the resource managing unit 306 stores the parameters, etc., used in a sequence of processes based on the process flow information 1100, in the resource management information storage unit 170 as the resource management information 170D, in response to a request from the flow executing unit 301.

Here, a description is given of the process flow information 1100 included in the application information 1000 for providing the "code delivery" service, by referring to FIG. 8. FIG. 8 illustrates an example of the process flow information 1100 according to the present embodiment.

The process flow information 1100 illustrated in FIG. 8 is information in which a sequence of processes (process flow) for implementing the "code delivery" service is defined.

The process flow information 1100 illustrated in FIG. 8 includes a flow ID 1101 indicating identification information uniquely identifying the process flow information 1100, and a flow name 1102 indicating the name of the process flow information 1100. Furthermore, the process flow information 1100 includes a flow detail group 1103 defining contents of the processes included in a sequence of processes, and a flow relationship group 1104 defining the connection relationship (preceding and following relationships) of the processes included in a sequence of processes.

The flow detail group 1103 includes flow details 1111 through 1115 respectively indicating the processes included in the sequence of processes. The flow details 1111 through 1115 define "detailName" for uniquely identifying the flow detail in the flow detail group 1103, "component" indicating the component for executing the process, and "parameters" indicating the parameters of the component. Note that in the following, "detailName" is also expressed as "flow detail name".

For example, the flow detail 1111 defines a process by the barcode recognition component 402, and the flow detail name of the flow detail 1111 is defined as "detail0". Similarly, for example, the flow detail 1112 defines a process by the branch component 401, and the flow detail name of the flow detail 1112 is defined as "detail1".

As described above, flow detail names are defined in the flow details 1111 through 1115, and therefore in the sequence of processes, processes by the same component can be handled as different processes. Specifically, for example, even when a plurality of processes by the barcode recognition component 402 are included in the sequence of processes, by applying different names as flow detail names defining the respective processes, the processes can be handled as different processes.

The flow relationship group 1104 includes connection relationships 1121 through 1125 defining the connection relationships (preceding and following relationships) of the flow details 1111 through 1115 included in the flow detail group 1103.

For example, the connection relationship 1121 defines "prev":"detail0" and "next:detail1". This indicates that the process, which comes next to the process defined in the flow detail 1111 of "detail0", is the process defined in flow detail 1112 of "detail1". Said differently, the connection relationship 1121 indicates that the component (next component) following the barcode recognition component 402, is the branch component 401.

Similarly, the connection relationship 1122 defines "prev":"detail1" and "next:detail2". This indicates that the process, which comes next to the process defined in the flow detail 1111 of "detail1", is the process defined in flow detail 1112 of "detail2". Said differently, the connection relationship 1122 indicates that the component (next component) following the branch component 401, is the storage A delivery component 403.

Note that the connection relationship 1123 defines "prev": "detail1" and "next:detail3". Therefore, the component following the branch component 401 is the storage A delivery component 403 and the storage B delivery component 404.

As described above, the flow relationship group 1104 defines the preceding and following relationships between the flow details. Said differently, the flow relationship group 1104 defines the preceding and following relationships between the components respectively defined by the flow details (that is, the order of executing the processes executed by the respective components).

Here, a process flow based on the process flow information 1100 illustrated in FIG. 8 (that is, a process flow for implementing the "code delivery" service service) is illustrated in FIG. 9. FIG. 9 is a diagram for describing an example of a process flow for implementing the "code delivery" service.

As illustrated in FIG. 9, in the process flow for implementing the "code delivery" service, the branch component 401 implements control such that the process of either the storage A delivery component 403 or the storage B delivery component 404 is executed. Said differently, the branch component 401 suppresses (skips) the execution of the process of either the storage A delivery component 403 or the storage B delivery component 404.

Accordingly, the process flow for implementing the "code delivery" service implements branching of a process (that is, the process is branched to either the process of delivering to the storage A or the process of delivering to the storage B, according to a recognition result of a barcode recognition process).

<Process Details (First Embodiment)>

Next, a description is given of details of processes by the information processing system 1 according to the present embodiment.

Figure 10:
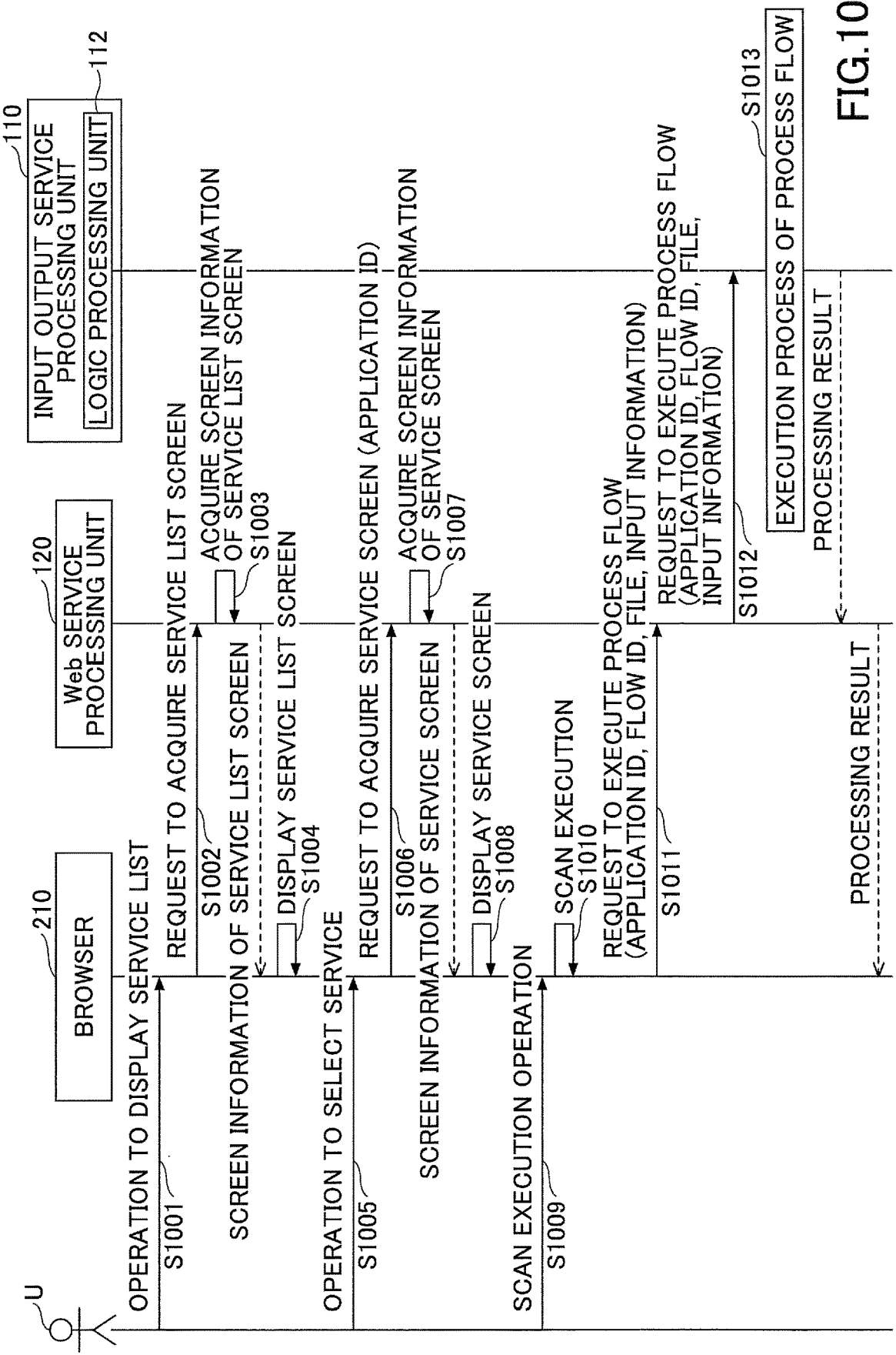
FIG. 10 is a sequence diagram of an example of the overall process performed when using the service according to the first embodiment of the present invention.

In the following, a description is given of a process performed when a user U of the device 20 uses the browser 210 to use the service provided by the service providing system 10, by referring to FIG. 10. FIG. 10 is a sequence diagram of an example of the overall process performed when using the service according to the present embodiment.

The user U uses the browser 210 of the device 20 to perform a display operation of displaying a list of services provided by the application information 1000 (step S1001).

When the browser 210 of the device 20 accepts a display operation for displaying a list of services, the browser 210 sends a request to acquire a service list screen to the web service processing unit 120 of the service providing system 10 (step S1002).

When the web service processing unit 120 receives the request to acquire a service list screen, the web service processing unit 120 acquires the screen information 2000 of the service list screen from the screen information storage unit 160 (step S1003). Then, the web service processing unit 120 returns the screen information 2000 of a service list screen to the browser 210.

Note that the screen information 2000 of a service list screen includes an application ID of the application information 1000 for providing a service, and a flow ID of the process flow information 1100 included in the application information 1000, for each service.

Figure 11A:
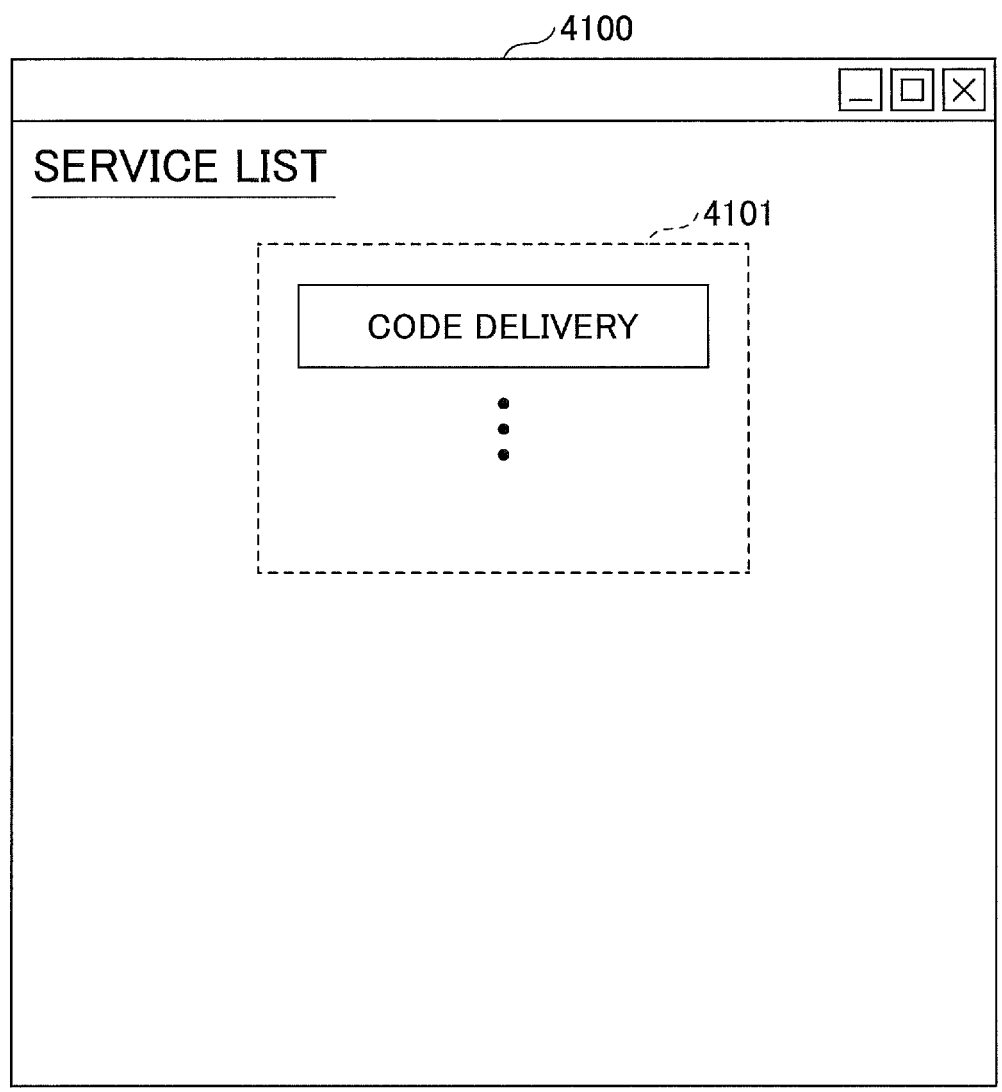
FIGS. 11A and 11B illustrate an example of a screen transition from a service list screen to a service screen according to the first embodiment of the present invention.

When the browser 210 of the device 20 receives the screen information 2000 of a service list screen, the browser 210 causes the operation panel 22 to display a service list screen 4100, for example, illustrated in FIG. 11A, based on the screen information 2000 (step S1004).

The service list screen 4100 illustrated in FIG. 11A includes a service name list 4101 that is a list of service names provided by the service providing system 10.

Next, the user U performs an operation of selecting a desired service from the service name list 4101 in the service list screen 4100 (step S1005). In the following description, it is assumed that "code delivery" has been selected from the service name list 4101 of the service list screen 4100.

When the browser 210 of the device 20 accepts the operation of selecting the service, the browser 210 sends a request to acquire a service screen to the web service processing unit 120 (step S1006). Note that the acquisition request includes an application ID of the application information 1000 for providing the "code delivery" service selected by the user U.

When the web service processing unit 120 receives the request to acquire a service screen, the web service processing unit 120 acquires the screen information 2000 (screen information 2000 of service screen) stored in the screen information storage unit 160 in association with the application ID included in the acquisition request (step S1007). Then, the web service processing unit 120 returns the acquired screen information 2000 to the browser 210.

Figure 11B:
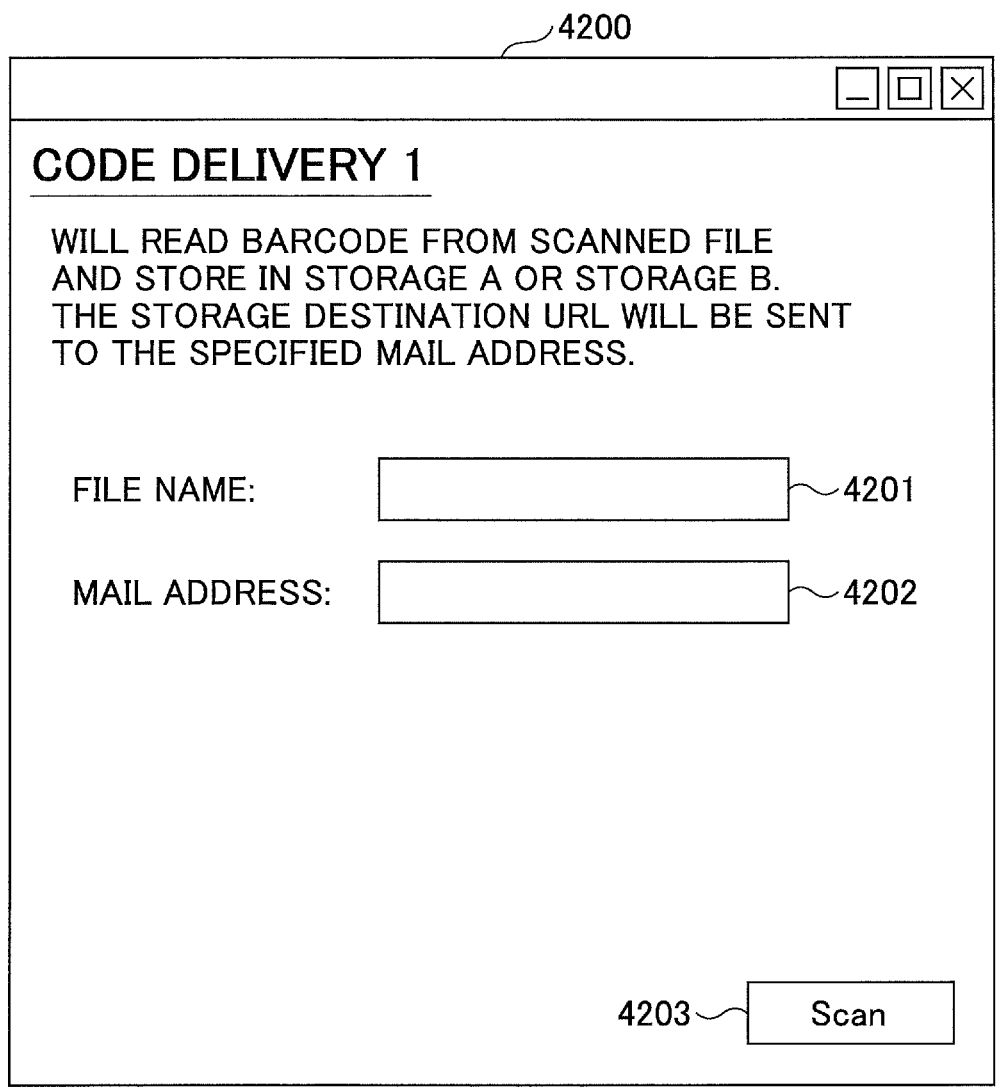

When the browser 210 of the device 20 receives the screen information 2000 of the service screen, the browser 210 causes the operation panel 22 to display a service screen 4200, for example, illustrated in FIG. 11B, based on the screen information 2000 (step S1008).

The service screen 4200 illustrated in FIG. 11B is a screen for using the "code delivery" service selected by the user U. The service screen 4200 illustrated in FIG. 11B includes a file name specification field 4201, a mail address specification field 4202, and a scan execution button 4203. (FIGS. 11A and 11B illustrate an example of a screen transition from a service list screen to a service screen.)

Here, the file name specification field 4201 is a field for specifying a file name of an electronic file generated by a scanning operation. The mail address specification field 4202 is a field for specifying the destination (mail address) to which the storage destination URL of the electronic file delivered to the storage A or the storage B, is to be delivered by mail. Note that the service screen 4200 may include, for example, a CC specification field and a BCC specification field, etc., for specifying a destination to which the electronic file is to be delivered by mail by way of CC or BCC.

Next, in the service screen 4200, the user U specifies a desired file name in the file name specification field 4201, and specifies a desired mail address in the mail address specification field 4202. Then, the user U sets an original document in the scanner 25 of the device 20, and presses the scan execution button 4203 (step S1009).

Here, in the following description, it is assumed that the user U has specified a file name "test" in the file name specification field 4201 and has specified a mail address "hoge@fuga.com" in the mail address specification field 4202.

When the browser 210 of the device 20 accepts the operation of pressing the scan execution button 4203, the scanner 25 scans the original document and generates an electronic file having a file name "test" (step S1010).

When the electronic file is generated by scanning, the browser 210 of the device 20 sends a request to execute a process flow for implementing the "code delivery" service to the web service processing unit 120 (step S1011).

Note that the execution request includes an application ID of the application information 1000 for providing the "code delivery" service and a flow ID of the process flow information 1100 for implementing the service. Furthermore, the execution request includes the electronic file generated by scanning, and input information (that is, the file name and the mail address) that has been input in the service screen 4200 by the user U.

When the web service processing unit 120 receives the request to execute a process flow, the web service processing unit 120 sends the execution request to the logic processing unit 112 of the input output service processing unit 110 (step S1012).

When the logic processing unit 112 of the input output service processing unit 110 receives the request to execute the process flow, the logic processing unit 112 executes a sequence of processes based on the process flow information 1100 corresponding to the application ID and the flow ID included in the execution request (step S1013).

Then, the logic processing unit 112 returns the processing result of the sequence of processes to the browser 210 of the device 20 via the web service processing unit 120.

Accordingly, in the service providing system 10 according to the present embodiment, the sequence of processes for implementing the "code delivery" service is executed, and the service is provided to the device 20.

Figure 12:
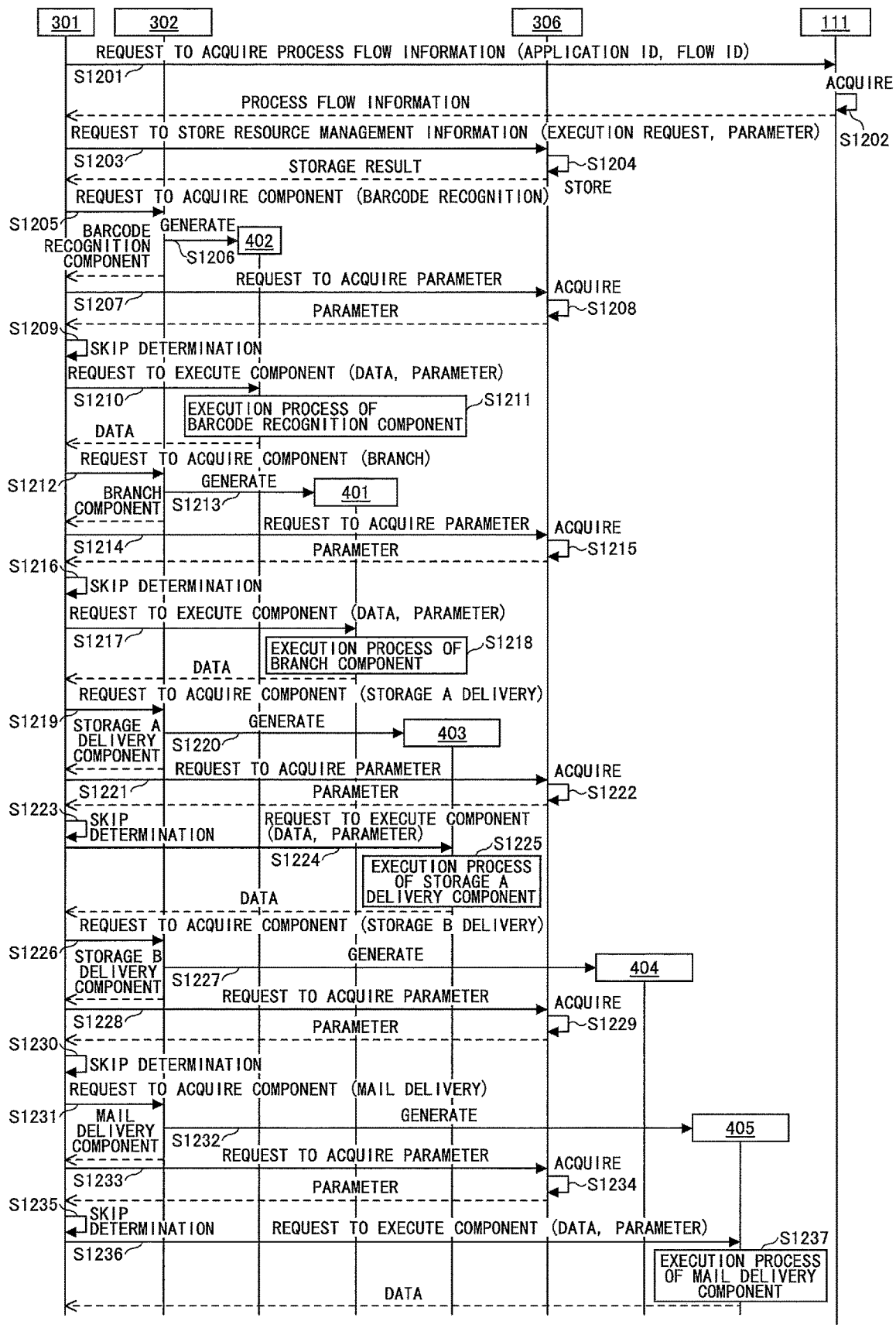
FIG. 12 is a sequence diagram of an example of a process of executing the process flow according to the first embodiment of the present invention.

Here, a detailed description is given of the process of executing the process flow of step S1013 described above, by referring to FIG. 12. FIG. 12 is a sequence diagram of an example of a process of executing the process flow according to the present embodiment.

When the flow executing unit 301 receives a request to execute the process flow, the flow executing unit 301 sends a request to acquire process flow information to the application managing unit 111 (step S1201). Note that the acquisition request includes the application ID and the flow ID included in the request to execute the process flow received from the web service processing unit 120.

When the application managing unit 111 receives the request to acquire the process flow information, the application managing unit 111 acquires the process flow information 1100 corresponding to the application ID and the flow ID included in the acquisition request, from the application information storage unit 150 (step S1202). Then, the application managing unit 111 returns the acquired process flow information 1100 to the flow executing unit 301. Accordingly, the process flow information 1100 illustrated in FIG. 8 is returned to the flow executing unit 301.

Next, when the flow executing unit 301 receives the process flow information 1100, the flow executing unit 301 sends a request to store resource management information, to the resource managing unit 306 (step S1203). Note that the storage request includes the request to execute the process flow received from the browser 210 in step S1201 and the parameters included in the flow details 1111 through 1115 included in the process flow information 1100.

When resource managing unit 306 receives the request to store resource management information, the resource managing unit 306 creates the resource management information 170D, for example, illustrated in FIG. 13, based on the request to execute the process flow and parameters included in the storage request. Furthermore, the resource managing unit 306 stores the created resource management information 170D in the resource management information storage unit 170 (step S1204). Then, the resource managing unit 306 returns the storage result to the flow executing unit 301.

Here, a description is given of the resource management information 170D stored in the resource management information storage unit 170, by referring to FIG. 13. FIG. 13 illustrates an example of the resource management information 170D according to the present embodiment.

As illustrated in FIG. 13, the resource management information 170D includes an execution request 171, parameters 172, and a processing result 173.

The execution request 171 is a request to execute a process flow. In the resource management information 170D illustrated in FIG. 13, the request to execute the process flow sent from the browser 210 in the format of a Hypertext Transfer Protocol (HTTP) is stored.

In the parameters 172, a parameter 1721 of the flow detail 1111 of "detail0", a parameter 1722 of the flow detail 1112 of "detail1", and a parameter 1723 of the flow detail 1113 of "detail2", are stored. Furthermore, in the parameters 172, a parameter 1724 of the flow detail 1114 of "detail3" and a parameter 1725 of the flow detail 1115 of "detail4" are stored.

That is, in the parameters 172, the parameter 1721 used by the barcode recognition component 402, the parameter 1722 used by the branch component 401, and the parameter 1723 used by the storage A delivery component 403, are stored. Similarly, in the parameters 172, the parameter 1724 used by the storage B delivery component 404, and the parameter 1725 used by the mail delivery component 405, are stored.

Here, the parameters 1721 through 1725 include "skip": "false". "skip" is a parameter indicating whether to skip the process of a component. In the case of "skip":"false", the flow executing unit 301 executes the process of the component, while in the case of "true", the process of the component is skipped.

Furthermore, the parameter 1721 includes "filename": "test". "filename" is an electronic file name of the processing target of the barcode recognition component 402. Note that "test" is the file name of the input information included in the request to execute the process flow.

Furthermore, the parameter 1722 includes "conditions". "conditions" includes "condition1" and "condition2", defining a branch condition and a control content of the branch component 401 in a case where the condition is satisfied.

That is, in "condition1", a conditional expression "result.detail0.value=storageA" is defined at "expressions". Furthermore, in "condition1", the flow detail name "detail3" that is the control target is defined at "flowdetailName", and the control content "skip" is defined at "excType". Here, "result.detail0.value" is the processing result of the flow detail name "detail0" (that is, the barcode recognition component 402).

Accordingly, when the conditional expression defined in "expressions" of "condition1" is satisfied, the process of the component of the flow detail name "detail3" (that is, the storage B delivery component 404) is skipped.

Similarly, in "condition2", a conditional expression "result.detail0.value=storageB" is defined at "expressions". Furthermore, in "condition2", the flow detail name "detail2" that is the control target is defined at "flowdetailName", and the control content "skip" is defined at "excType".

Accordingly, when the conditional expression defined in "expressions" of "condition2" is satisfied, the process of the component of the flow detail name "detail2" (that is, the storage A delivery component 403) is skipped.

As described above, the parameters in the branch component 401 are information in which a branch condition and the control content in the case where the branch condition is satisfied (which component is to be skipped) are defined.

Note that in the branch condition, various conditions expressed by logical formulas may be defined. For example, "sign" included in the branch condition may be "eq" expressing an equality sign "=", or "lt" expressing an inequality sign "<", etc. Furthermore, in "excType", other than "skip", for example, "exc" indicating to execute a component defined in the flow detail name that is the control target when conditional expression is satisfied may be defined.

Furthermore, the parameter 1725 includes "to": "hoge@fuga.com". "to" is the destination mail address of the mail transmission by the mail delivery component 405. Note that "hoge@fuga.com" is the mail address of the input information included in the request to execute the process flow.

As described above, in the parameters 172, a parameter used by a component defined in the flow detail is stored for each flow detail name (detailName). Note that when a process of each component is executed, the processing result of the component is stored in the processing result 173.

Referring back to FIG. 12, when the flow executing unit 301 receives the storage result from the resource managing unit 306, the flow executing unit 301 sends a request to acquire a component based on the process flow information 1100, to the component managing unit 302 (step S1205).

That is, the flow executing unit 301 sends a request to acquire the component "barcode recognition component" specified in the flow detail 1111 of the process flow information 1100, to the component managing unit 302.

When the component managing unit 302 receives the request to acquire a component, the component managing unit 302 generates the barcode recognition component 402 (step S1206). Note that the barcode recognition component 402 may be generated by using the API for generating a component defined in the component common I/F 400.

Then, the component managing unit 302 returns the generated barcode recognition component 402 to the flow executing unit 301. That is, the component managing unit 302 returns an address in a memory (for example, the RAM 14) in which the barcode recognition component 402 is loaded, to the flow executing unit 301.

When the barcode recognition component 402 is returned, the flow executing unit 301 sends a request to acquire a parameter of the component, to the resource managing unit 306 (step S1207). Note that the acquisition request includes, for example, a flow detail name "detail0" of the flow detail 1111.

When the resource managing unit 306 receives the request to acquire a parameter, the resource managing unit 306 acquires the parameter 1721 included in the resource management information 170D illustrated in FIG. 13 (step S1208). Then, the resource managing unit 306 returns the acquired parameter 1721 to the flow executing unit 301.

Next, when the flow executing unit 301 receives the parameter 1721, the flow executing unit 301 determines whether to skip the process of the barcode recognition component 402, based on the "skip" parameter included in the parameter 1721 (step S1209).

That is, the flow executing unit 301 determines whether the "skip" parameter included in the parameter 1721 is "false" or "true". Here, the "skip" parameter included in the parameter 1721 is "false", and therefore the flow executing unit 301 determines not to skip the process of the barcode recognition component 402.

The flow executing unit 301 sends a component execution request to the barcode recognition component 402 (step S1210). Note that the execution request includes data and the parameter 1721.

Here, the data is an electronic file received from the browser 210, as a data format "InputStream" (an electronic file generated by scanning). That is, the flow executing unit 301 transfers the electronic file, which is transferred as the data format "InputStream" from the browser 210, to the barcode recognition component 402 simply as "data" (without considering the data format), and requests the execution of the process. In the present embodiment, an electronic file, etc., for which the data format is not considered as described above, are simply referred to as "data".

When the barcode recognition component 402 receives the component execution request, the barcode recognition component 402 performs an execution process of the component (step S1211). Then, the barcode recognition component 402 returns data indicating the processing result of the executed process, to the flow executing unit 301.

Figure 14:
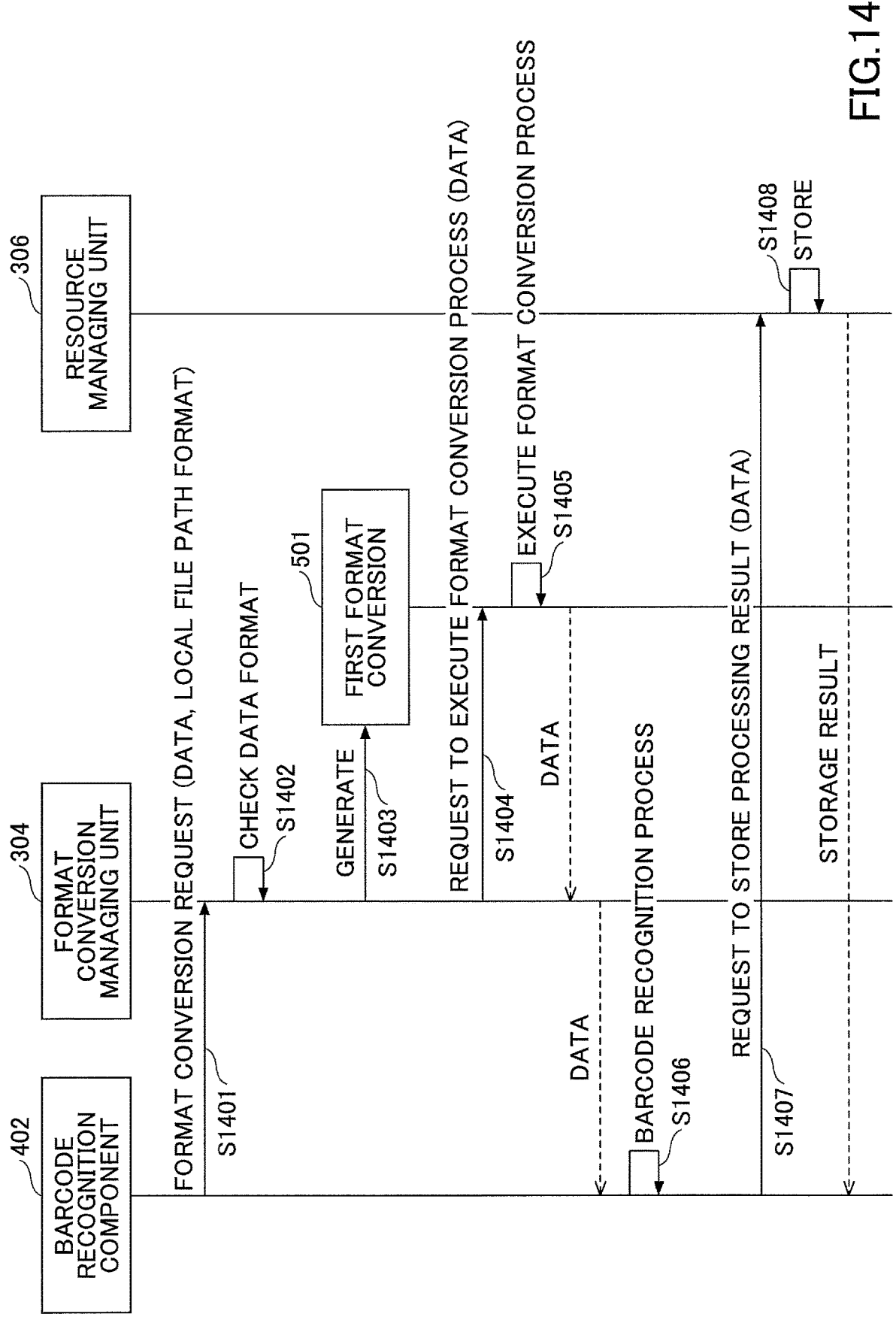
FIG. 14 is a sequence diagram of an example of the execution process of a barcode recognition component according to the first embodiment of the present invention.

Here, a description is given of the execution process of the barcode recognition component 402, by referring to FIG. 14. FIG. 14 is a sequence diagram of an example of the execution process of the barcode recognition component 402 according to the present embodiment.

First, the barcode recognition component 402 sends a format conversion request to the format conversion managing unit 304 (step S1401). Note that the format conversion request includes data and a specification of "LocalFilePath" indicating the data format that can be handled by the barcode recognition component 402.

When the format conversion managing unit 304 receives the format conversion request, the format conversion managing unit 304 checks whether the data format of the data included in the format conversion request and the specified data format match each other (step S1402).

Here, the data format of the data included in the received format conversion request is "InputStream", while the specified data format is "LocalFilePath". Therefore, the format conversion managing unit 304 determines that the data format of the data included in the format conversion request and the specified data format do not match each other.

Then, the format conversion managing unit 304 refers to the format conversion information table 3000, identifies the first format conversion 501 for converting "InputStream" into "LocalFilePath", and generates the identified first format conversion 501 (step S1403). Note that the first format conversion 501 may be generated by using the API defined in the format conversion common I/F 500.

Next, the format conversion managing unit 304 sends a format conversion request to the generated first format conversion 501 (step S1404). Note that the format conversion request includes data.

When the first format conversion 501 receives the format conversion request, the first format conversion 501 converts the data format of the data included in the request, from "InputStream" to "LocalFilePath" (step S1405). Then, the first format conversion 501 returns the data after conversion to the barcode recognition component 402 via the format conversion managing unit 304.

When the barcode recognition component 402 receives the data after format conversion, the barcode recognition component 402 uses the parameter 1721 to execute a process (step S1406). That is, the barcode recognition component 402 executes a barcode recognition process with respect to the electronic file having the file name "test" specified in the "filename" parameter included in the parameter 1721. Note that the barcode recognition component 402 executes the barcode recognition process with respect to the electronic file, by the code recognizing unit 131 of the document service unit 130.

Next, when the barcode recognition component 402 executes the process, the barcode recognition component 402 sends a request to store the processing result to the resource managing unit 306 (step S1407). Note that the storage request includes data indicating the result of the process by the barcode recognition component 402.

When the resource managing unit 306 receives the request to store the processing result, the resource managing unit 306 creates the processing result based on the data included in the storage request, and stores the processing result in the processing result 173 in the resource management information 170D (step S1408). Then, the resource managing unit 306 returns the storage result to the barcode recognition component 402.

Here, a description is given of the processing result by the barcode recognition component 402 stored in the resource management information 170D, by referring to FIG. 15. FIG. 15 illustrates an example of the resource management information in which the processing result of the barcode recognition component 402 is stored.

As illustrated in FIG. 15, in the resource management information 170D, a processing result 1731 by the barcode recognition component 402 is stored. That is, the processing result 173 in the resource management information 170D includes the processing result "value":"storage" of the barcode recognition component 402 in the flow detail name "detail0" of the flow detail 1111.

As described above, in the processing result 1731 of the resource management information 170D, the processing result of the component for executing the processes included in the sequence of processes is stored.

Referring back to FIG. 12, when the flow executing unit 301 receives the data indicating the processing result of the process of executing the component, the flow executing unit 301 sends a request to acquire a component based on the process flow information 1100, to the component managing unit 302 (step S1212).

That is, the flow executing unit 301 sends a request to acquire the component "branch component" specified in the flow detail 1112 of the process flow information 1100, to the component managing unit 302.

When the component managing unit 302 receives the request to acquire a component, the component managing unit 302 generates the branch component 401 (step S1213). Note that the branch component 401 may be generated by using the API for generating a component defined in the component common I/F 400.

Then, the component managing unit 302 returns the generated branch component 401 to the flow executing unit 301. That is, the component managing unit 302 returns an address in a memory (for example, the RAM 14) in which the branch component 401 is loaded, to the flow executing unit 301.

When the branch component 401 is returned, the flow executing unit 301 sends a request to acquire a parameter of the component, to the resource managing unit 306 (step S1214). Note that the acquisition request includes, for example, a flow detail name "detail1" of the flow detail 1112.

When the resource managing unit 306 receives the request to acquire a parameter, the resource managing unit 306 acquires the parameter 1722 included in the resource management information 170D illustrated in FIG. 13 (step S1215). Then, the resource managing unit 306 returns the acquired parameter 1722 to the flow executing unit 301.

Next, when the flow executing unit 301 receives the parameter 1722, the flow executing unit 301 determines whether to skip the process of the branch component 401, based on the "skip" parameter included in the parameter 1722 (step S1216).

That is, the flow executing unit 301 determines whether the "skip" parameter included in the parameter 1721 is "false" or "true". Here, the "skip" parameter included in the parameter 1722 is "false", and therefore the flow executing unit 301 determines not to skip the process of the branch component 401.

The flow executing unit 301 sends a component execution request to the branch component 401 (step S1217). Note that the execution request includes data and the parameter 1722.

When the branch component 401 receives the component execution request, the branch component 401 performs an execution process of the component (step S1218). Then, the branch component 401 returns data indicating the processing result of the executed process, to the flow executing unit 301. Note that details of the execution process of the branch component 401 are described below.

In the following description, it is assumed that the "skip" parameter of the parameter 1724 included in the resource management information 170D illustrated in FIG. 13 has been updated to "true", by the execution process of the branch component 401.

When the flow executing unit 301 receives the data indicating the processing result of the process of executing the component, the flow executing unit 301 sends a request to acquire a component based on the process flow information 1100, to the component managing unit 302 (step S1219).

That is, the flow executing unit 301 sends a request to acquire the component "storage A delivery component" specified in the flow detail 1113 of the process flow information 1100, to the component managing unit 302.

When the component managing unit 302 receives the request to acquire a component, the component managing unit 302 generates the storage A delivery component 403 (step S1220). Note that the storage A delivery component 403 may be generated by using the API for generating a component defined in the component common I/F 400.

Then, the component managing unit 302 returns the generated storage A delivery component 403 to the flow executing unit 301. That is, the component managing unit 302 returns an address in a memory (for example, the RAM 14) in which the storage A delivery component 403 is loaded, to the flow executing unit 301.

When the storage A delivery component 403 is returned, the flow executing unit 301 sends a request to acquire a parameter of the component, to the resource managing unit 306 (step S1221). Note that the acquisition request includes, for example, a flow detail name "detail2" of the flow detail 1113.

When the resource managing unit 306 receives the request to acquire a parameter, the resource managing unit 306 acquires the parameter 1723 included in the resource management information 170D illustrated in FIG. 13 (step S1222). Then, the resource managing unit 306 returns the acquired parameter 1723 to the flow executing unit 301.

Next, when the flow executing unit 301 receives the parameter 1723, the flow executing unit 301 determines whether to skip the process of the storage A delivery component 403, based on the "skip" parameter included in the parameter 1723 (step S1223).

That is, the flow executing unit 301 determines whether the "skip" parameter included in the parameter 1723 is "false" or "true". Here, the "skip" parameter included in the parameter 1723 is "false", and therefore the flow executing unit 301 determines not to skip the process of the storage A delivery component 403.

The flow executing unit 301 sends a component execution request to the storage A delivery component 403 (step S1224). Note that the execution request includes data and the parameter 1723.

When the storage A delivery component 403 receives the component execution request, the storage A delivery component 403 performs an execution process of the component (step S1225). Then, the storage A delivery component 403 returns data indicating the processing result of the executed process, to the flow executing unit 301.

Figure 16:
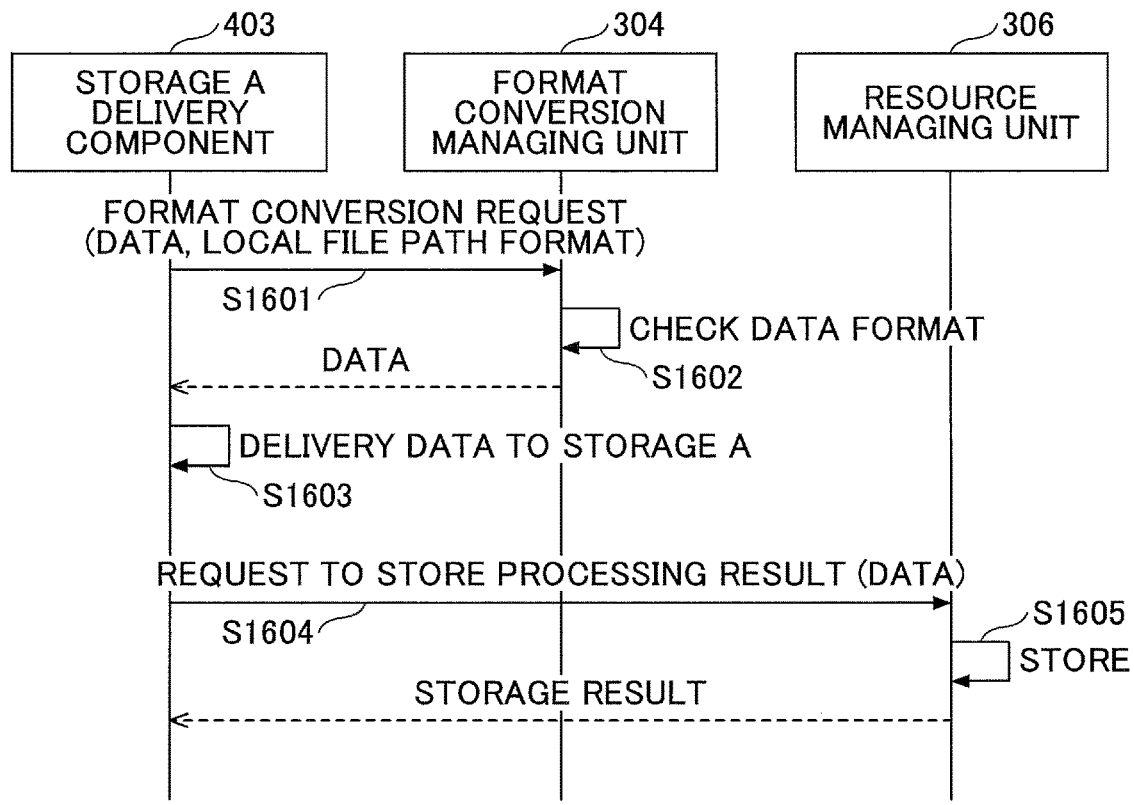
FIG. 16 is a sequence diagram of an example of the execution process of a storage A delivery component according to the first embodiment of the present invention.

Here, a description is given of the execution process of the storage A delivery component 403, by referring to FIG. 16. FIG. 16 is a sequence diagram of an example of the execution process of the storage A delivery component 403 according to the present embodiment.

First, the storage A delivery component 403 sends a format conversion request to the format conversion managing unit 304 (step S1601). Note that the format conversion request includes data and a specification of "LocalFilePath" indicating the data format that can be handled by the storage A delivery component 403.

When the format conversion managing unit 304 receives the format conversion request, the format conversion managing unit 304 checks whether the data format of the data included in the format conversion request and the specified data format match each other (step S1602).

Here, the data format of the data included in the received format conversion request is "LocalFilePath", and the specified data format is also "LocalFilePath". Therefore, the format conversion managing unit 304 determines that the data format of the data included in the format conversion request and the specified data format match each other.

Then, the format conversion managing unit 304 returns the data included in the format conversion request to the storage A delivery component 403. In this way, when the data formats are determined to match each other in the data format check, the format conversion managing unit 304 does not generate a format conversion.

When the storage A delivery component 403 receives the data, the storage A delivery component 403 executes a process by using the parameter 1723 (step S1603). That is, the storage A delivery component 403 uses the API "/external service name/process/folder" illustrated in FIG. 5A with respect to the file processing unit 141 of the external service cooperating unit $140_1$, to deliver (upload) the electronic file. Accordingly, the storage A delivery component 403 uploads the electronic file in the storage A.

Next, when the storage A delivery component 403 executes the process, the storage A delivery component 403 sends a request to store the processing result to the resource managing unit 306 (step S1604). Note that the storage request includes data indicating the result of the process of the storage A delivery component 403.

When the resource managing unit 306 receives the request to store the processing result, the resource managing unit 306 creates the processing result based on data included in the storage request, and stores the processing result in the processing result 173 of the resource management information 170D (step S1605). Then, the resource managing unit 306 returns the storage result to the storage A delivery component 403. Note that here, as the processing result of the storage A delivery component 403, the upload destination URL of the electronic file (that is, the storage destination URL) is stored in the processing result 173.

Referring back to FIG. 12, when the flow executing unit 301 receives the data indicating the processing result of the process of executing the component, the flow executing unit 301 sends a request to acquire a component based on the process flow information 1100, to the component managing unit 302 (step S1226).

That is, the flow executing unit 301 sends a request to acquire the component "storage B delivery component" specified in the flow detail 1114 of the process flow information 1100, to the component managing unit 302.

When the component managing unit 302 receives the request to acquire a component, the component managing unit 302 generates the storage B delivery component 404 (step S1227). Note that the storage B delivery component 404 may be generated by using the API for generating a component defined in the component common I/F 400.

Then, the component managing unit 302 returns the generated storage B delivery component 404 to the flow executing unit 301. That is, the component managing unit 302 returns an address in a memory (for example, the RAM 14) in which the storage B delivery component 404 is loaded, to the flow executing unit 301.

When the storage B delivery component 404 is returned, the flow executing unit 301 sends a request to acquire a parameter of the component, to the resource managing unit 306 (step S1228). Note that the acquisition request includes, for example, a flow detail name "detail3" of the flow detail 1114.

When the resource managing unit 306 receives the request to acquire a parameter, the resource managing unit 306 acquires the parameter 1724 included in the resource management information 170D illustrated in FIG. 13 (step S1229). Then, the resource managing unit 306 returns the acquired parameter 1724 to the flow executing unit 301.

Next, when the flow executing unit 301 receives the parameter 1724, the flow executing unit 301 determines whether to skip the process of the storage B delivery component 404, based on the "skip" parameter included in the parameter 1723 (step S1230).

That is, the flow executing unit 301 determines whether the "skip" parameter included in the parameter 1724 is "false" or "true".

Here, as described above, in the execution process of the branch component 401 of step S1218, the "skip" parameter included in the parameter 1724 is updated to "true". Therefore, the flow executing unit 301 determines to skip the process of the storage B delivery component 404.

When the flow executing unit 301 determines to skip the process of the component, the flow executing unit 301 sends a request to acquire the next component based on the process flow information 1100, to the component managing unit 302 (step S1231).

That is, the flow executing unit 301 sends a request to acquire the component "mail delivery component" specified in the flow detail 1115 of the process flow information 1100, to the component managing unit 302.

As described above, when the "skip" parameter included in the parameter of the component is "true", the flow executing unit 301 skips the process of the component. That is, when branching is included in the process flow, the flow executing unit 301 updates the "skip" parameter of any of the components to "true" according to a branch condition, to implement the branching of the process.

When the component managing unit 302 receives the request to acquire a component, the component managing unit 302 generates the mail delivery component 405 (step S1232). Note that the mail delivery component 405 may be generated by using the API for generating a component defined in the component common I/F 400.

Then, the component managing unit 302 returns the generated mail delivery component 405 to the flow executing unit 301. That is, the component managing unit 302 returns an address in a memory (for example, the RAM 14) in which the mail delivery component 405 is loaded, to the flow executing unit 301.

When the mail delivery component 405 is returned, the flow executing unit 301 sends a request to acquire a parameter of the component, to the resource managing unit 306 (step S1233). Note that the acquisition request includes, for example, a flow detail name "detail4" of the flow detail 1115.

When the resource managing unit 306 receives the request to acquire a parameter, the resource managing unit 306 acquires the parameter 1725 included in the resource management information 170D illustrated in FIG. 13 (step S1234). Then, the resource managing unit 306 returns the acquired parameter 1725 to the flow executing unit 301.

Next, when the flow executing unit 301 receives the parameter 1725, the flow executing unit 301 determines whether to skip the process of the mail delivery component 405, based on the "skip" parameter included in the parameter 1725 (step S1235).

That is, the flow executing unit 301 determines whether the "skip" parameter included in the parameter 1725 is "false" or "true". Here, the "skip" parameter included in the parameter 1725 is "false", and therefore the flow executing unit 301 determines to not skip the process of the mail delivery component 405.

The flow executing unit 301 sends a component execution request to the mail delivery component 405 (step S1236). Note that the execution request includes data and the parameter 1723.

When the mail delivery component 405 receives the component execution request, the mail delivery component 405 performs an execution process of the component (step S1237). Then, the mail delivery component 405 returns data indicating the processing result of the executed process, to the flow executing unit 301.

Accordingly, the service providing system 10 according to the present embodiment can provide the "code delivery" service to the device 20.

Figure 17:
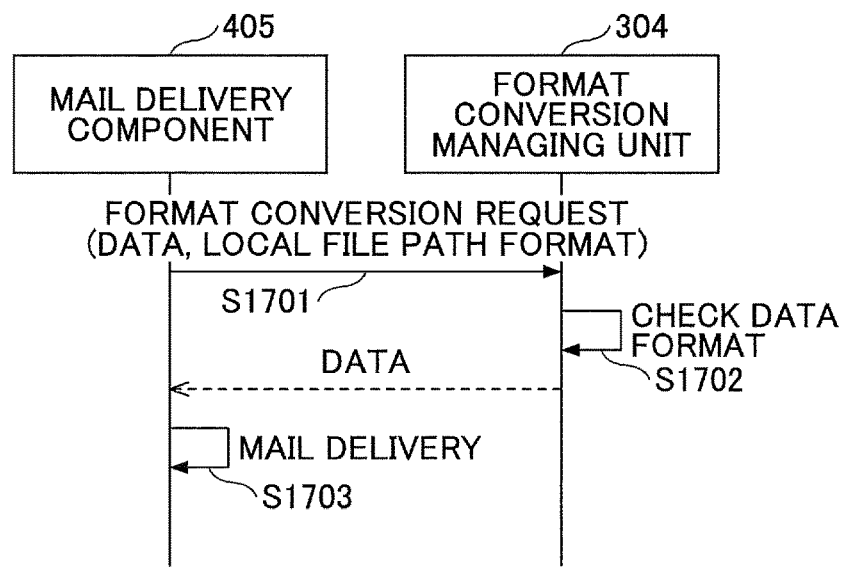
FIG. 17 is a sequence diagram of an example of the execution process of a mail delivery component according to the first embodiment of the present invention.

Here, a description is given of the execution process of the mail delivery component 405, by referring to FIG. 17. FIG. 17 is a sequence diagram of an example of the execution process of the mail delivery component 405 according to the present embodiment.

First, the mail delivery component 405 sends a format conversion request to the format conversion managing unit 304 (step S1701). Note that the format conversion request includes data and a specification of "LocalFilePath" indicating the data format that can be handled by the mail delivery component 405.

When the format conversion managing unit 304 receives the format conversion request, the format conversion managing unit 304 checks whether the data format of the data included in the format conversion request and the specified data format match each other (step S1702).

Here, the data format of the data included in the received format conversion request is "LocalFilePath", and the specified data format is also "LocalFilePath". Therefore, the format conversion managing unit 304 determines that the data format of the data included in the format conversion request and the specified data format match each other.

Then, the format conversion managing unit 304 returns the data included in the format conversion request to the mail delivery component 405. In this way, when the data formats are determined to match each other in the data format check, the format conversion managing unit 304 does not generate a format conversion.

When the mail delivery component 405 receives the data, the mail delivery component 405 executes a process by using the parameter 1725 (step S1703). That is, the mail delivery component 405 creates a mail describing the storage destination URL of the storage A in which the electronic file is stored, and sends the mail to the mail address "hoge@fuga.com" specified in the "to" parameter. Note that the mail delivery component 405 creates the mail and executes the sending process by the mail delivering unit 132 of the document service unit 130.

Figure 18:
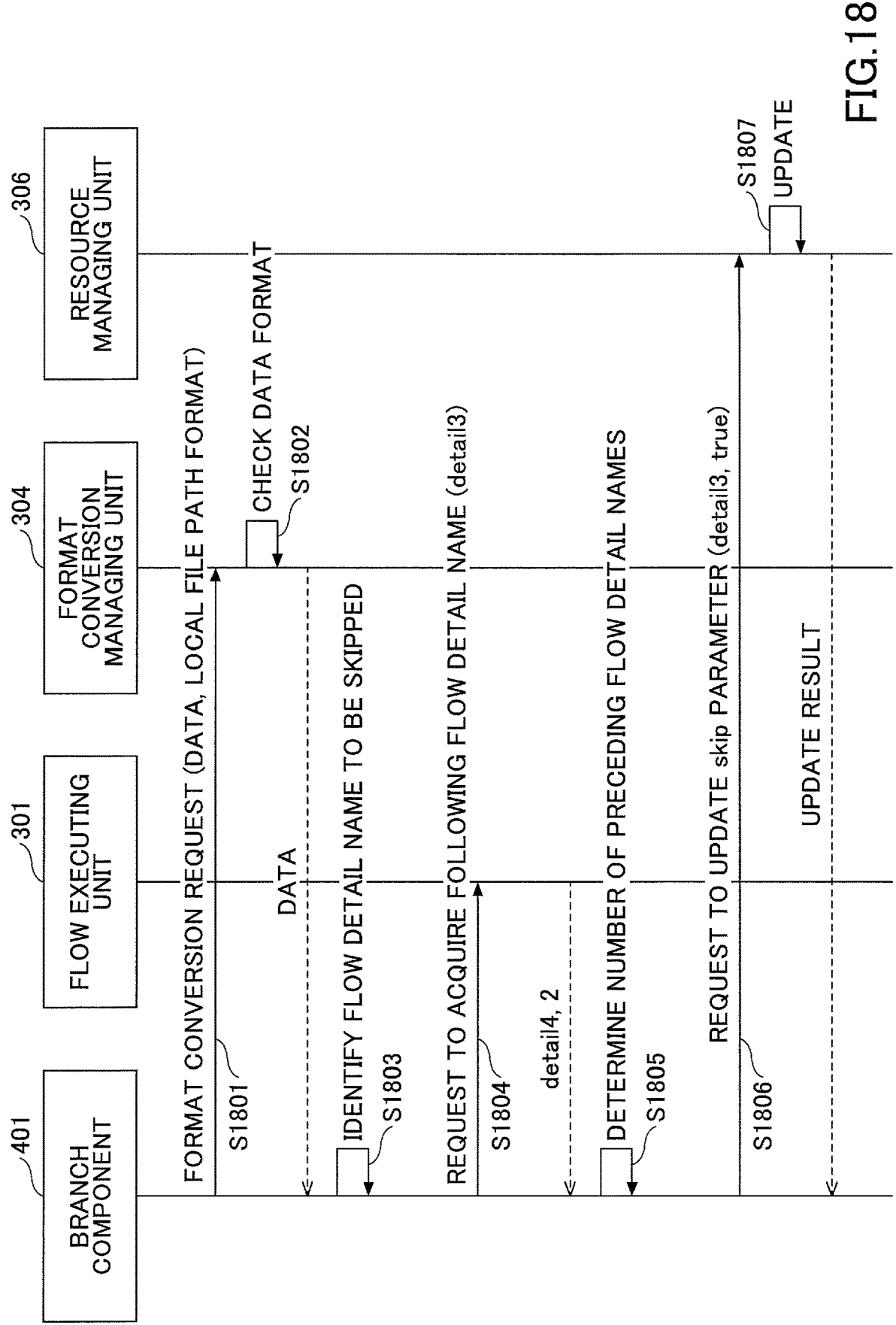
FIG. 18 is a sequence diagram of an example of the execution process of a branch component according to the first embodiment of the present invention.

Here, a description is given of the execution process of the branch component 401 in step S1218 described above, by referring to FIG. 18. FIG. 18 is a sequence diagram of an example of the execution process of the branch component 401 according to the present embodiment.

First, the branch component 401 sends a format conversion request to the format conversion managing unit 304 (step S1801). Note that the format conversion request includes data and a specification of "LocalFilePath" indicating the data format that can be handled by the branch component 401.

When the format conversion managing unit 304 receives the format conversion request, the format conversion managing unit 304 checks whether the data format of the data included in the format conversion request and the specified data format match each other (step S1802).

Here, the data format of the data included in the received format conversion request is "LocalFilePath", and the specified data format is also "LocalFilePath". Therefore, the format conversion managing unit 304 determines that the data format of the data included in the format conversion request and the specified data format match each other.

Then, the format conversion managing unit 304 returns the data included in the format conversion request to the branch component 401. In this way, when the data formats are determined to match each other in the data format check, the format conversion managing unit 304 does not generate a format conversion.

When the branch component 401 receives the data, the branch component 401 identifies the flow detail name to be skipped, based on the branch condition (conditions) defined in the parameter 1722 (step S1803).

That is, the branch component 401 determines which conditional expression (expressions) is satisfied, between "condition1" and "condition2" defined in the parameter 1722. Then, the branch component 401 acquires "flowdetailName" corresponding to the conditional expression of the satisfied condition, to identify the flow detail name to be skipped.

Here, as illustrated in FIG. 15, the processing result (result.detail.value) of the barcode recognition component 402 stored in the resource management information 170D is "storageA". Therefore, the branch component 401 identifies that the flow detail name to be skipped is "detail3".

Note that when none of the conditional expressions defined in the parameter is satisfied, or when a contradictory conditional expression is defined in the parameter, the branch component 401 is to return information indicating an error to the browser 210.

When the branch component 401 identifies the flow detail name to be skipped, the branch component 401 sends a request to acquire a following flow detail name to the flow executing unit 301 (step S1804). Note that the acquisition request includes the flow detail name "detail3" identified in step S1803.

Then, the flow executing unit 301 returns "detail4" that is the following flow detail name of the flow detail name "detail3", and the number of preceding flow details "2" of the flow detail name "detail4". Note that the flow executing unit 301 identifies the following flow detail name and calculates the number of preceding flow details of the following flow detail name, based on the process flow information 1100, and returns the identified and calculated information.

Next, the branch component 401 determines whether the number of preceding flow details of the following flow detail name acquired in step S1804 is greater than or equal to 2 (step S1805). Here, the number of the preceding flow details "2" of the following flow detail name "detail4" acquired in step S1804, is determined to be greater than or equal to 2 by the branch component 401.

Here, when the number of preceding flow details of the following flow detail name is greater than or equal to 2, the flow detail of the following flow detail name is a flow detail in which a plurality of flow details are merged. Said differently, the mail delivery component 405, which is defined in the flow detail 1115 having the flow detail name "detail4", is a component in which the storage A delivery component 403 and the storage B delivery component 404 are merged.

Therefore, in this case, the branch component 401 is to skip the storage B delivery component 404 defined in the flow detail name "detail3".

Next, the branch component 401 sends a request to update the skip parameter, to the resource managing unit 306 (step S1806). Note that the update request includes the flow detail name "detail3" in which the storage B delivery component 404 that is the skip target is defined, and the update content "true".

When the resource managing unit 306 receives the request to update the skip parameter, the resource managing unit 306 updates the "skip" parameter, which is included in the parameter 1724 of the flow detail name "detail3" in the resource management information 170D, to "true" (step S1807). Then, the resource managing unit 306 returns the update result to the branch component 401.

Accordingly, the "skip" parameter, which is included in the parameter 1724 of the flow detail name "detail3" in the resource management information 170D, is updated from "false" to "true". Therefore, as described above, the flow executing unit 301 skips the process of the storage B delivery component 404 defined in the flow detail 1114 having the flow detail name "detail3".

As described above, in the service providing system 10 according to the present embodiment, when branching is included in the process flow for implementing the service, the branch component 401 makes a determination with respect to a conditional expression, and skips the execution of a process of a following component according to the determination result. Accordingly, the service providing system 10 according to the present embodiment can execute a process flow including branching of a process.

Note that in the service providing system 10 according to the present embodiment, the parameter is acquired and a skip determination is made after generating a component; however, the present embodiment is not so limited. The parameter may be acquired and a skip determination may be made before generating a component. Accordingly, the service providing system 10 according to the present embodiment may refrain from generating a component, when the service providing system 10 has determined to skip a process of the component by the skip determination.

Note that when branching is not included in the process flow, the service providing system 10 is to sequentially execute the components for executing the processes included in the process flow.

Figure 19:
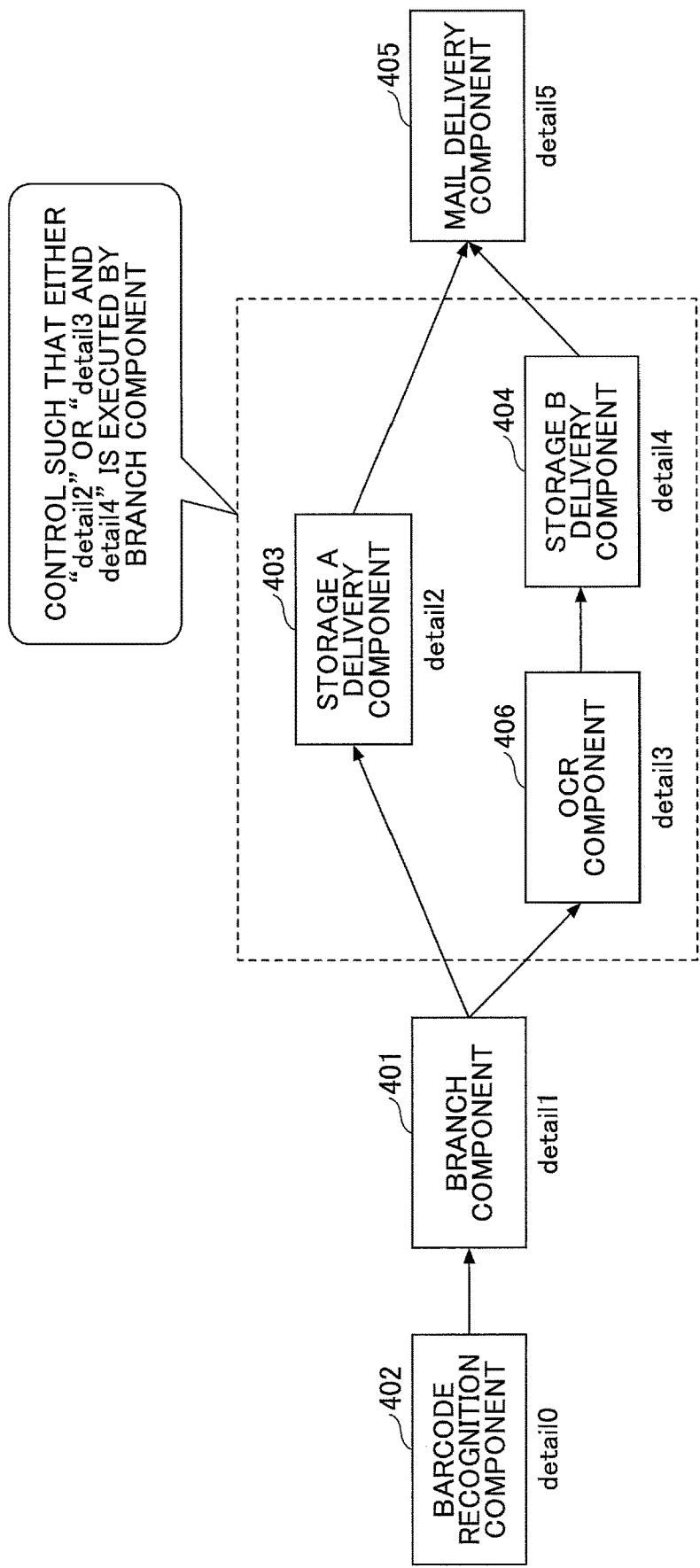
FIG. 19 is a diagram for describing another example of a process flow (part 1) according to the first embodiment of the present invention.

Here, another example of a process flow including branching is described by referring to FIG. 19. FIG. 19 is a diagram for describing another example of a process flow including branching (part 1).

The process flow illustrated in FIG. 19 is for executing the process of "the storage A delivery component 403" or "an OCR component 406 and the storage B delivery component 404" according to the processing result of the barcode recognition component 402. That is, the process flow illustrated in FIG. 19 is for executing a process of a component defined in the flow detail name "detail2" or a process of components defined in the flow detail names "detail3" and "detail4", according to the processing result of the component defined in the flow detail name "detail0".

As described above, in the process flow illustrated in FIG. 19, for example, when executing a process of the storage A delivery component 403, the processes of a plurality of components (the OCR component 406 and the storage B delivery component 404) are skipped. Note that in the process flow of FIG. 19, the parameters used for the process of the branch component 401 may be defined similarly to those of the process flow in FIG. 9.

Figure 20:
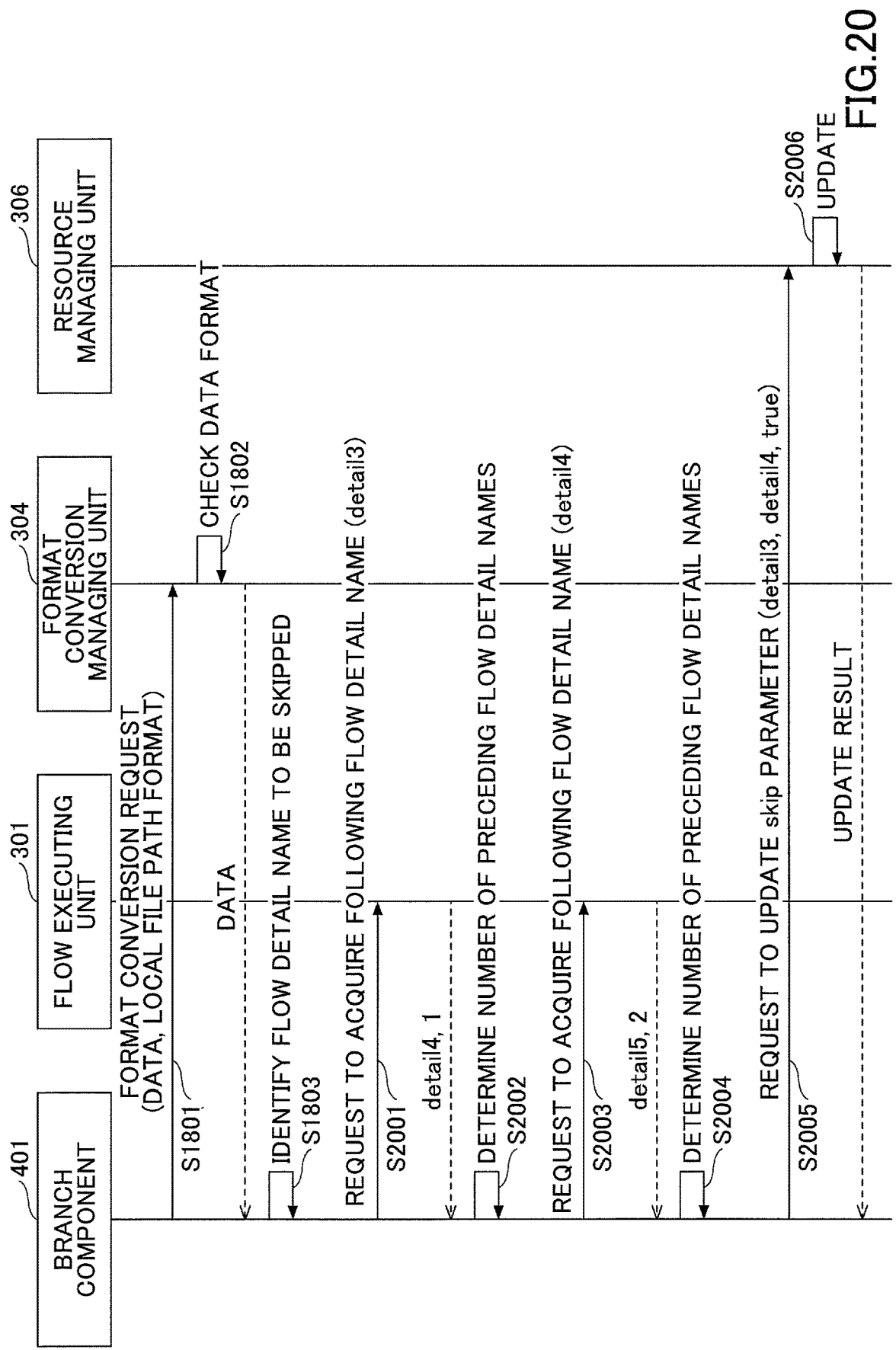
FIG. 20 is a sequence diagram of an example of the execution process of the branch component (part 1) according to the first embodiment of the present invention.

A description is given of an execution process of the branch component 401 in a case of skipping the processes of the OCR component 406 and the storage B delivery component 404 in the process flow of FIG. 19, by referring to FIG. 20. FIG. 20 is a sequence diagram of an example of the execution process of the branch component 401 according to the present embodiment (part 1). Note that with respect to the same processes as those of FIG. 18, the same step numbers as those of FIG. 18 are applied, and descriptions of these steps are omitted.

When the branch component 401 identifies the flow detail name to be skipped, the branch component 401 sends a request to acquire a following flow detail name to the flow executing unit 301 (step S2001). Note that the acquisition request includes the flow detail name "detail3" identified in step S1803.

Then, the flow executing unit 301 returns "detail4" that is the following flow detail name of the flow detail name "detail3", and the number of preceding flow details "1" of the flow detail name "detail4".

Next, the branch component 401 determines whether the number of preceding flow details of the following flow detail name acquired in step S2001 is greater than or equal to 2 (step S2002). Here, the number of the preceding flow details "1" of the following flow detail name "detail4" acquired in step S2001, is determined not to be greater than or equal to 2 by the branch component 401.

In this case, the branch component 401 further sends a request to acquire a following flow detail name to the flow executing unit 301 (step S2003). Note that the acquisition request includes the flow detail name "detail4" identified in step S2003.

Then, the flow executing unit 301 returns "detail5" that is the following flow detail name of the flow detail name "detail4", and the number of preceding flow details "2" of the flow detail name "detail5".

Next, the branch component 401 determines whether the number of preceding flow details of the following flow detail name acquired in step S2003 is greater than or equal to 2 (step S2004). Here, the number of the preceding flow details "2" of the following flow detail name "detail5" acquired in step S2003, is determined to be greater than or equal to 2 by the branch component 401.

That is, the mail delivery component 405 defined in the flow detail having the flow detail name "detail5", is a component in which a plurality of components (the storage A delivery component 403 and the storage B delivery component 404) are merged.

Therefore, in this case, the branch component 401 is to skip the OCR component 406 and the storage B delivery component 404 that are respectively defined in the flow detail names "detail3" and "detail4".

Next, the branch component 401 sends a request to update the skip parameter, to the resource managing unit 306 (step S2005). Note that the update request includes the flow detail name "detail3" of the OCR component 406, the flow detail name "detail4" defining the storage B delivery component 404, and the update content "true".

When the resource managing unit 306 receives the request to update the skip parameter, the resource managing unit 306 updates the "skip" parameter, which is included in the parameter of flow detail name "detail3" in the resource management information 170D, to "true". Furthermore, the resource managing unit 306 updates the skip" parameter, which is included in the parameter of flow detail name "detail4" in the resource management information 170D, to "true" (step S2006). Then, the resource managing unit 306 returns the update result to the branch component 401.

Accordingly, the "skip" parameter of the flow detail name "detail3" and the skip" parameter of the flow detail name "detail4" in the resource management information 170D, are updated from "false" to "true". Therefore, in this case, in the process flow of FIG. 19, the flow executing unit 301 skips the process of the OCR component 406 and the process of the storage B delivery component 404.

Here, another example of a process flow including branching is described by referring to FIG. 21. FIG. 21 is a diagram for describing another example of a process flow including branching (part 2).

The process flow illustrated in FIG. 21 is for executing the process of "the storage A delivery component 403", "the storage B delivery component 404", or "a storage C delivery component 407" according to the processing result of the barcode recognition component 402. That is, the process flow illustrated in FIG. 21 is for executing a process of a component defined in the flow detail name "detail2", "detail3", or "detail4", according to the processing result of the component defined in the flow detail name "detail0".

As described above, in the process flow illustrated in FIG. 21, for example, when executing a process of the storage A delivery component 403, the processes of a plurality of components (the storage B delivery component 404 and the storage C delivery component 407) are skipped.

Here, the parameter used by the branch component 401 in the process flow of FIG. 21 described above, may be defined as, for example, a parameter 1722A illustrated in FIG. 22. That is, the parameter 1722A used by the branch component 401 includes "condtion1" through "condtion3". Furthermore, in the "flowdetailName" parameter in each of the "condtion1" through "condtion3" includes specifications of a plurality of flow detail names.

For example, in the "flowdetailName" parameter in "condtion1", the flow detail names "detail3" and "detail4" are specified. Accordingly, when the conditional expression defined at "expressions" in "condtion1" is satisfied, the processes of the components of the flow detail names "detail3" and "detail4" are skipped.

Similarly, in the "flowdetailName" parameter in "condtion2", the flow detail names "detail2" and "detail4" are specified. Accordingly, when the conditional expression defined at "expressions" in "condtion2" is satisfied, the processes of the components of the flow detail names "detail2" and "detail4" are skipped.

Figure 23:
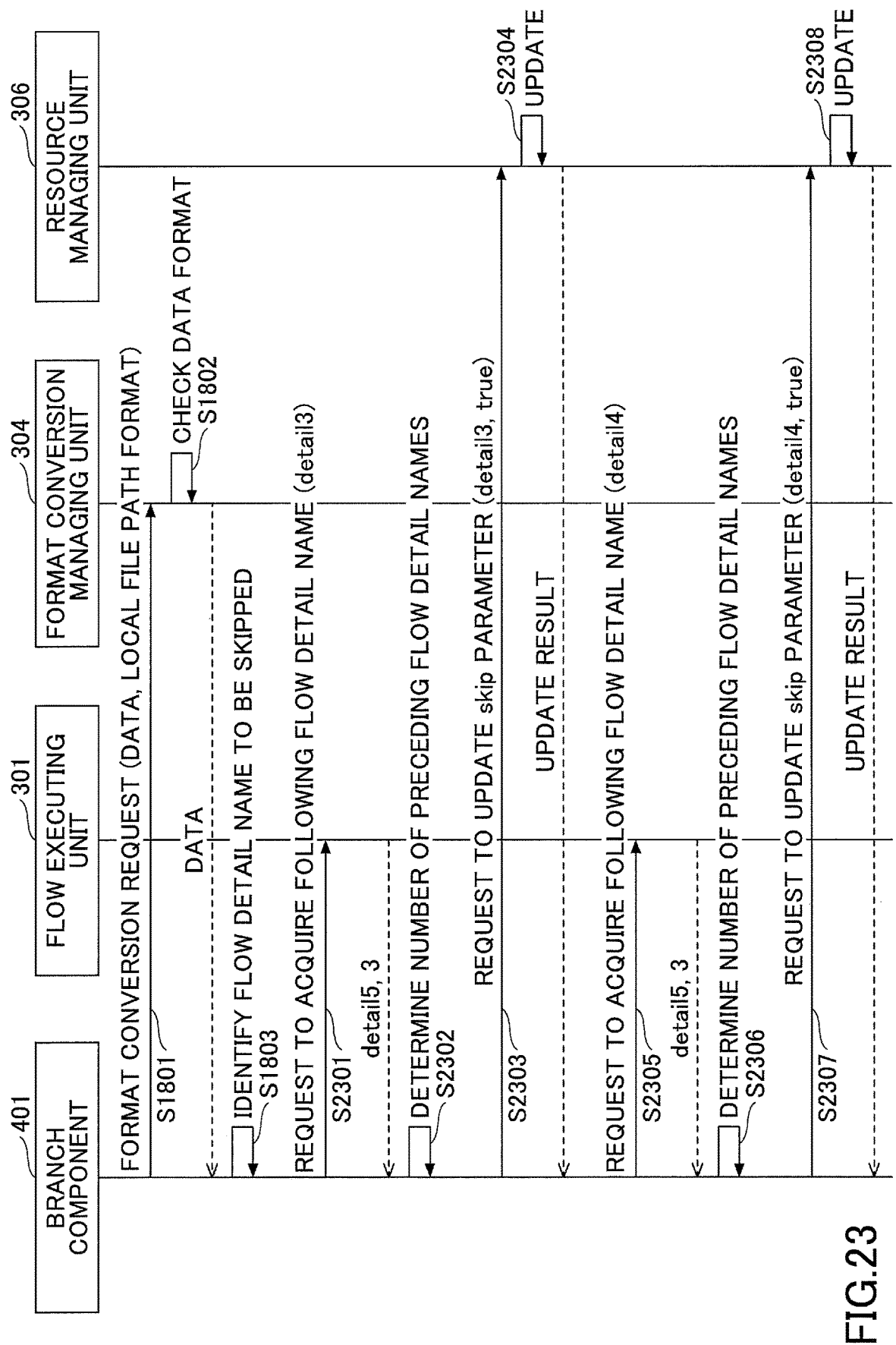
FIG. 23 is a sequence diagram of an example of the execution process of the branch component (part 2) according to the first embodiment of the present invention.

A description is given of an execution process of the branch component 401 in a case of skipping the processes of the storage B delivery component 404 and the storage C delivery component 407 in the process flow of FIG. 21, by referring to FIG. 23. FIG. 23 is a sequence diagram of an example of the execution process of the branch component 401 according to the present embodiment (part 2). Note that with respect to the same processes as those of FIG. 18, the same step numbers as those of FIG. 18 are applied, and descriptions of these steps are omitted.

When the branch component 401 identifies the flow detail names "detail3" and "detail4" to be skipped, the branch component 401 sends a request to acquire a following flow detail name to the flow executing unit 301 (step S2301). Note that the acquisition request includes the flow detail name "detail3", among the flow detail names "detail3" and "detail4" identified in step S1803.

Then, the flow executing unit 301 returns "detail5" that is the following flow detail name of the flow detail name "detail3", and the number of preceding flow details "3" of the flow detail name "detail5".

Next, the branch component 401 determines whether the number of preceding flow details of the following flow detail name acquired in step S2301 is greater than or equal to 2 (step S2302). Here, the number of the preceding flow details "3" of the following flow detail name "detail5" acquired in step S2301, is determined to be greater than or equal to 2 by the branch component 401.

That is, the mail delivery component 405 defined in the flow detail having the flow detail name "detail5", is a component where a plurality of components are merged. Therefore, in this case, the branch component 401 is to skip the storage B delivery component 404 defined in the flow detail name "detail3".

Next, the branch component 401 sends a request to update the skip parameter, to the resource managing unit 306 (step S2303). Note that the update request includes the flow detail name "detail3" of the storage B delivery component 404.

When the resource managing unit 306 receives the request to update the skip parameter, the resource managing unit 306 updates the "skip" parameter, which is included in the parameter of flow detail name "detail3" in the resource management information 170D, to "true" (step S2304). Then, the resource managing unit 306 returns the update result to the branch component 401.

Accordingly, the "skip" parameter of the flow detail name "detail3" in the resource management information 170D, is updated from "false" to "true". Therefore, in this case, in the process flow of FIG. 21, the flow executing unit 301 skips the process of the storage B delivery component 404.

Next, the branch component 401 sends a request to acquire a following flow detail name to the flow executing unit 301 (step S2305). Note that the acquisition request includes the flow detail name "detail4", among the flow detail names "detail3" and "detail4" identified in step S1803.

Then, the flow executing unit 301 returns "detail5" that is the following flow detail name of the flow detail name "detail4", and the number of preceding flow details "3" of the flow detail name "detail5".

Next, the branch component 401 determines whether the number of preceding flow details of the following flow detail name acquired in step S2305 is greater than or equal to 2 (step S2306). Here, the number of the preceding flow details "3" of the following flow detail name "detail5" acquired in step S2305, is determined to be greater than or equal to 2 by the branch component 401.

That is, the mail delivery component 405 defined in the flow detail having the flow detail name "detail5", is a component where a plurality of components are merged. Therefore, in this case, the branch component 401 is to skip the storage C delivery component 407 defined in the flow detail name "detail4".

Next, the branch component 401 sends a request to update the skip parameter, to the resource managing unit 306 (step S2307). Note that the update request includes the flow detail name "detail4" of the storage C delivery component 407.

When the resource managing unit 306 receives the request to update the skip parameter, the resource managing unit 306 updates the "skip" parameter, which is included in the parameter of flow detail name "detail4" in the resource management information 170D, to "true" (step S2308). Then, the resource managing unit 306 returns the update result to the branch component 401.

Accordingly, the "skip" parameter of the flow detail name "detail4" in the resource management information 170D, is updated from "false" to "true". Therefore, in this case, in the process flow of FIG. 21, the flow executing unit 301 skips the process of the storage C delivery component 407.

As described above, in the process flow of FIG. 21, when executing the process of the storage A delivery component 403, the flow executing unit 301 skips the processes of the storage B delivery component 404 and the storage C delivery component 407.

Second Embodiment

Next, a description is given of a second embodiment. Note that in the second embodiment, mainly the points that are different from those of the first embodiment are described. The functions and processes that are substantially the same as those of the first embodiment are denoted by the same reference numerals, and descriptions of the same elements are omitted.

<Functional Configuration (Second Embodiment)>

Figure 24:
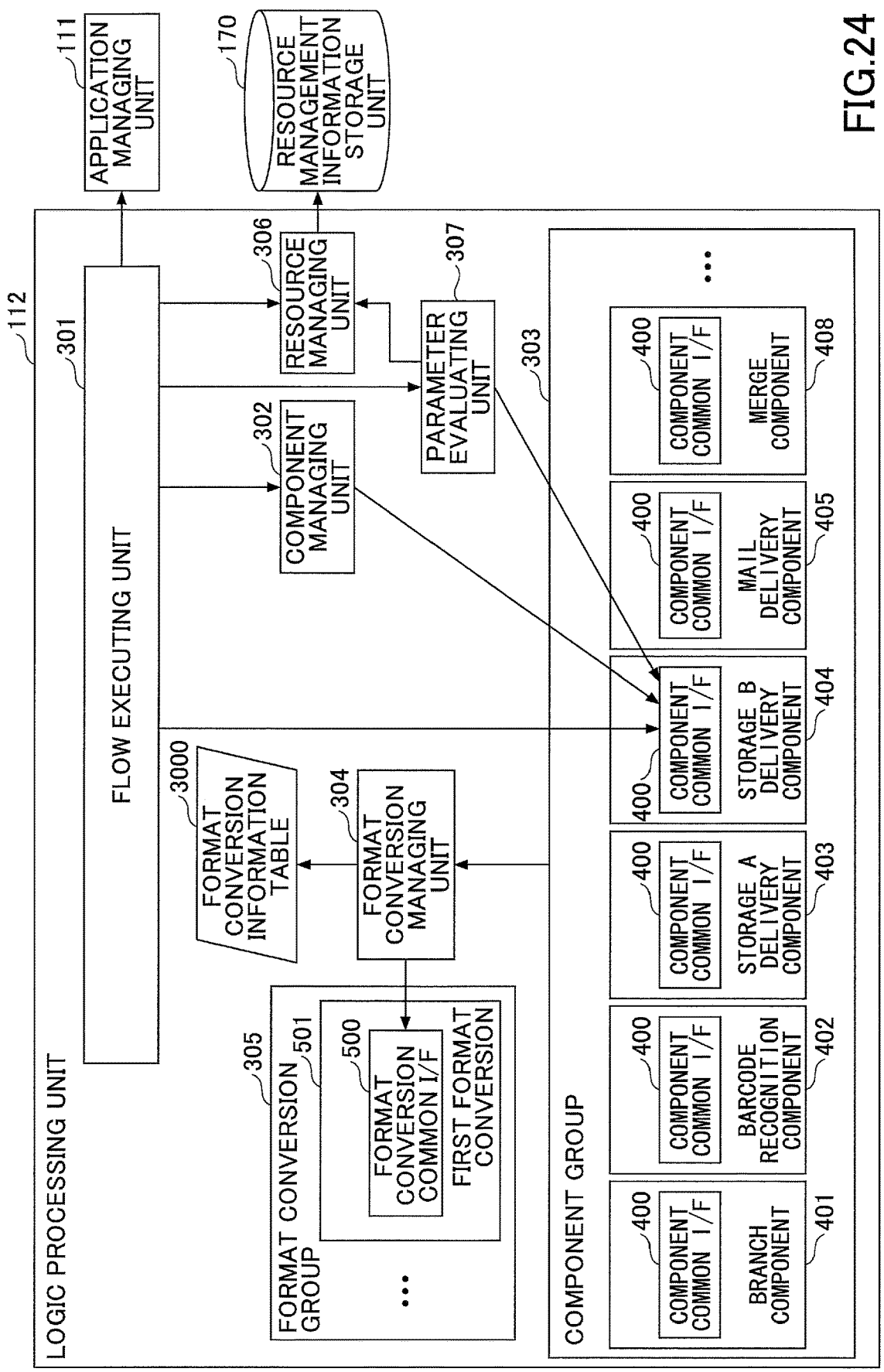
FIG. 24 illustrates an example of a functional configuration of the logic processing unit according to a second embodiment of the present invention.

First, a description is given of details of the functional configuration of the logic processing unit 112 according to the present embodiment, by referring to FIG. 24. FIG. 24 illustrates an example of a functional configuration of the logic processing unit 112 according to the present embodiment.

The logic processing unit 112 illustrated in FIG. 24 includes a parameter evaluating unit 307. The parameter evaluating unit 307 acquires a parameter from the resource managing unit 306 according to a request from the flow executing unit 301, and determines whether the acquired parameter includes a replacement specification. Here, a replacement specification is a specification to replace a value of a parameter for which a replacement specification is made, for example, with a processing result of another component, etc., and is expressed by "${storage destination of processing result, etc.}", etc.

Furthermore, the component group 303 in the logic processing unit 112 illustrated in FIG. 24 includes a merge component 408. The merge component 408 is a component for controlling the merging of processes included in the process flow.

Next, a process flow a process flow for implementing the "code delivery" service according to the present embodiment is illustrated in FIG. 25. FIG. 25 is a diagram for describing another example of a process flow for implementing the "code delivery" service.

In the process flow for implementing the "code delivery" service according to the present embodiment, first, the branch component 401 implements control such that the process of either the storage A delivery component 403 or the storage B delivery component 404 is executed.

Next, as illustrated in FIG. 25, in the process flow for implementing the "code delivery" service according to the present embodiment, the merge component 408 outputs the processing result of a preceding component, as a processing result of the merge component 408. That is, the merge component 408 outputs the processing result of the component that has been executed, among the storage A delivery component 403 or the storage B delivery component 404, as the processing result of the merge component 408.

Accordingly, in the process flow for implementing the "code delivery" service according to the present embodiment, the mail delivery component 405 does not need to consider which one of the storage A delivery component 403 or the storage B delivery component 404 has been executed. Said differently, the mail delivery component 405 can acquire the URL of the storage destination of the electronic file as the processing result of the merge component 408, regardless of the branch result by the merge component 408.

Therefore, for example, the user such as the creator of the process flow information 1100 can use the merge component 408 to specify a parameter for each of the components following the merge component 408, without considering the branching, even when the process flow includes branching.

Here, the process flow information 1100 of the process flow in FIG. 25, is illustrated in FIG. 26. FIG. 26 illustrates another example of the process flow information 1100 according to the present embodiment.

Similar to the first embodiment, the process flow information 1100 illustrated in FIG. 26 includes the flow ID 1101, the flow name 1102, the flow detail group 1103, and the flow relationship group 1104.

The flow detail group 1103 in the process flow information 1100 illustrated in FIG. 26 includes the flow details 1111 through 1114 respectively indicating the processes included in the process flow of FIG. 25, a flow detail 1116, and a flow detail 1115A.

For example, the flow detail 1116 defines a process by the merge component 408, and the flow detail name of the flow detail 1116 is defined as "detail4". Similarly, the flow detail 1115A defines a process by the mail delivery component 405, and the flow detail name of the flow detail 1115A is defined as "detail5".

Note that the flow relationship group 1104 defines the connection relationships (preceding and following relationships) of the flow details 1111 through 1114, the flow detail 1116, and the flow detail 1115A, for implementing the process flow of FIG. 25.

<Process Details (Second Embodiment)>

Figure 27:
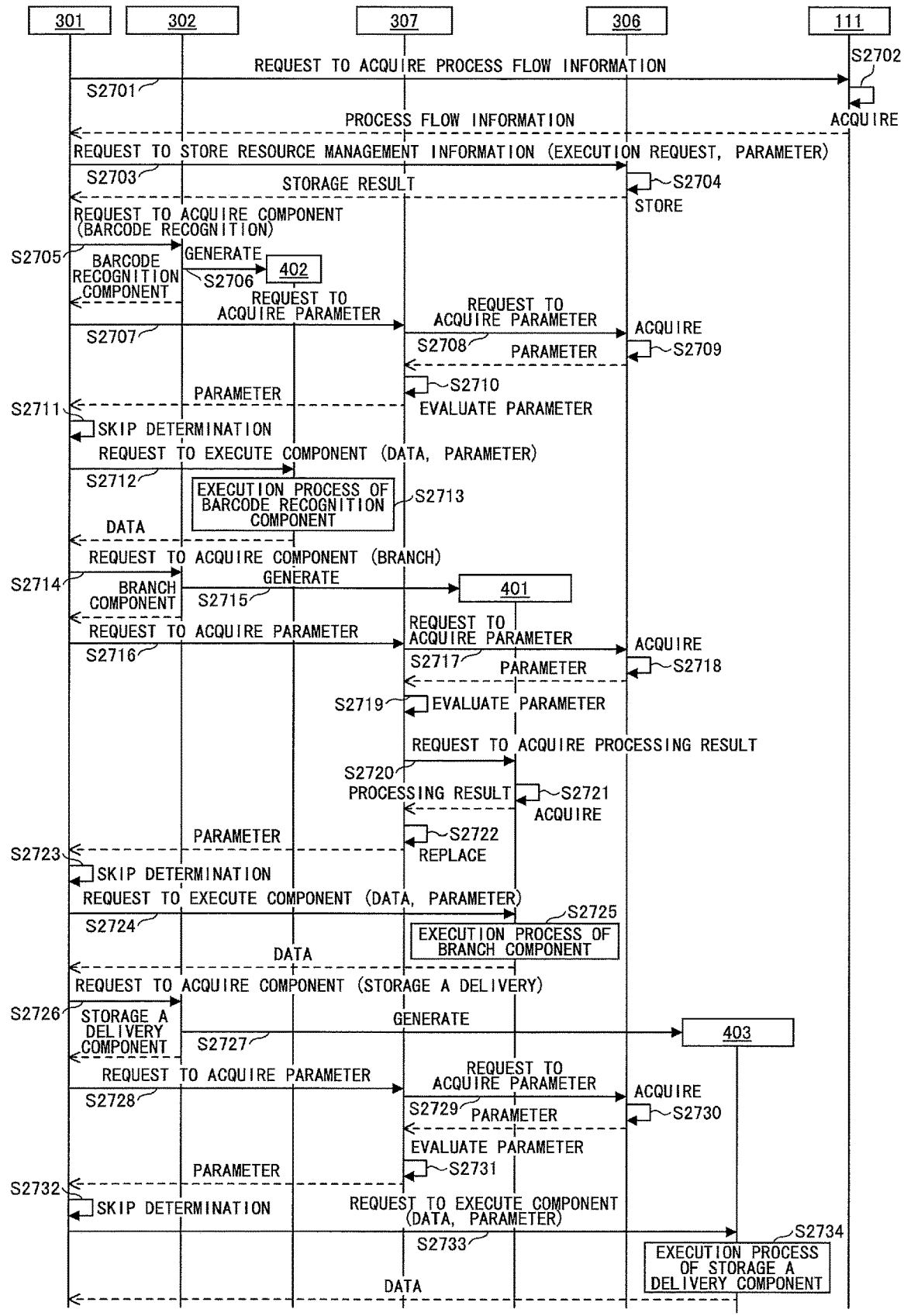
FIG. 27 is a sequence diagram (1/2) of an example of a process of executing the process flow according to the second embodiment of the present invention.
Figure 28:
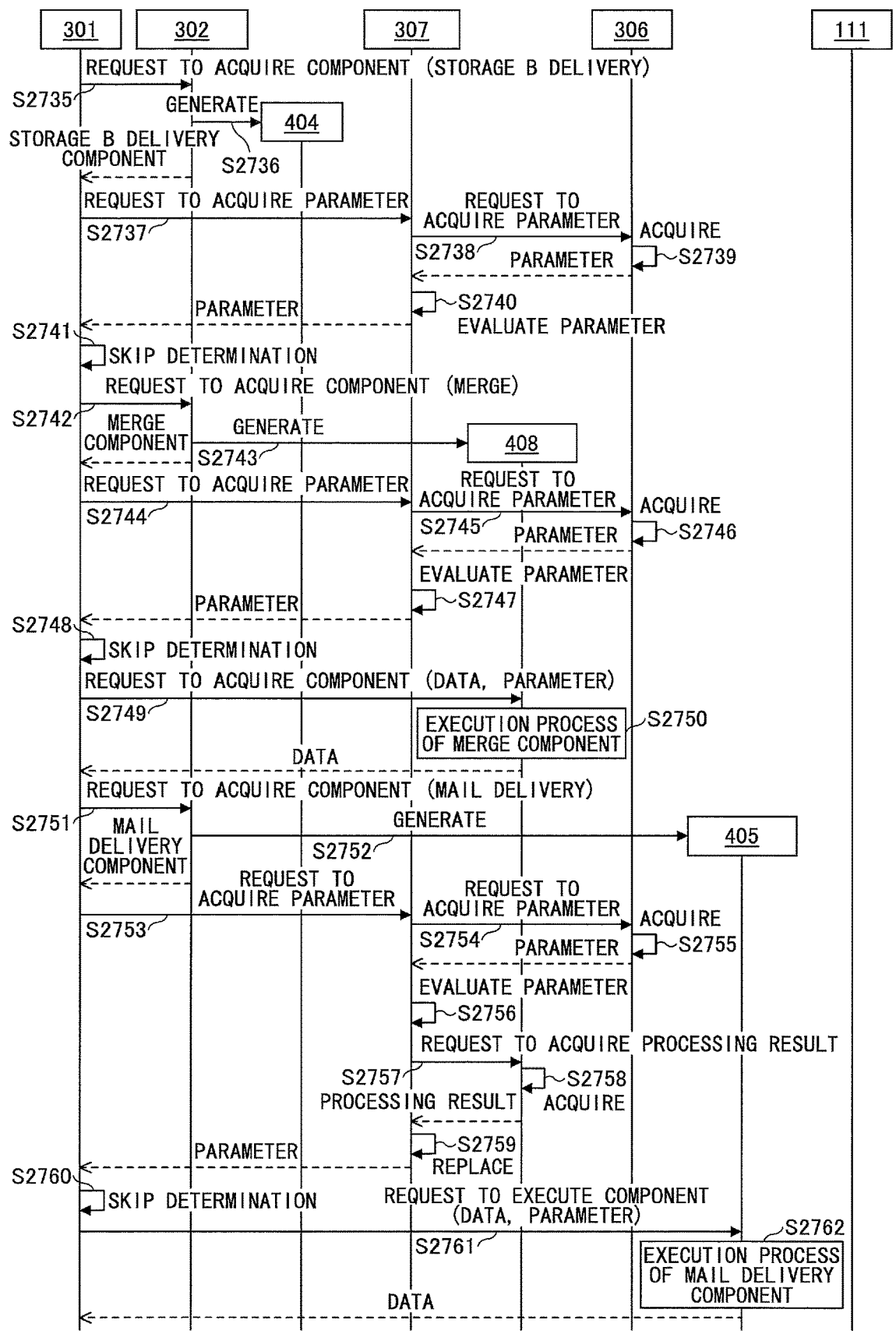
FIG. 28 is a sequence diagram (2/2) of an example of a process of executing the process flow according to the second embodiment of the present invention.

Next, a description is given of details of processes by the information processing system 1 according to the present embodiment. In the following, the details of the execution process of the process flow of FIG. 25 are described, by referring to FIGS. 27 and 28. FIGS. 27 and 28 are a sequence diagram of an example of a process of executing the process flow according to the present embodiment. Note that the overall process of service usage of FIG. 10 is the same as that of the first embodiment, and therefore descriptions of the overall process are omitted.

When the flow executing unit 301 receives a request to execute the process flow, the flow executing unit 301 sends a request to acquire process flow information to the application managing unit 111 (step S2701). Note that the acquisition request includes the application ID and the flow ID included in the request to execute the process flow received from the web service processing unit 120.

When the application managing unit 111 receives the request to acquire the process flow information, the application managing unit 111 acquires the process flow information 1100 corresponding to the application ID and the flow ID included in the acquisition request, from the application information storage unit 150 (step S2702). Then, the application managing unit 111 returns the acquired process flow information 1100 to the flow executing unit 301. Accordingly, the process flow information 1100 illustrated in FIG. 26 is returned to the flow executing unit 301.

Next, when the flow executing unit 301 receives the process flow information 1100, the flow executing unit 301 sends a request to store resource management information, to the resource managing unit 306 (step S2703). Note that the storage request includes the request to execute the process flow received in step S2701 and the parameters included in the flow details 1111 through 1114, the flow detail 1116, and the flow detail 1115A included in the process flow information 1100 illustrated in FIG. 26.

When resource managing unit 306 receives the request to store resource management information, the resource managing unit 306 creates the resource management information 170D, for example, illustrated in FIG. 29, based on the request to execute the process flow and parameters included in the storage request. Furthermore, the resource managing unit 306 stores the created resource management information 170D in the resource management information storage unit 170 (step S2704). Then, the resource managing unit 306 returns the storage result to the flow executing unit 301.

Here, a description is given of the resource management information 170D stored in the resource management information storage unit 170, by referring to FIG. 29. FIG. 29 illustrates an example of the resource management information 170D according to the present embodiment.

The execution request 171 is a request to execute the process flow, similar to the first embodiment. The execution request 171 stores a request to execute the process flow sent from the browser 210 in the format of a HTTP request. Furthermore, the processing result 173 stores the processing result of a component, when the process of a component is executed, similar to the first embodiment.

In the parameters 172, a parameter 1711 of the flow detail 1111 of "detail0", a parameter 1712 of the flow detail 1112 of "detail1", and a parameter 1713 of the flow detail 1113 of "detail2", are stored. Furthermore, in the parameters 172, a parameter 1714 of the flow detail 1114 of "detail3", a parameter 1716 of the flow detail 1116 of "detail4", and a parameter 1715A of the flow detail 1115A of "detail5", are stored.

Here, "${result.detail0.value}" defined the parameter 1722, and "${result.detail4.url}" defined in the parameter 1725A are replacement specifications. That is, "${result.detail0.value}" indicates to replace the value of the parameter with an item name (key) "value" included in the processing result (result) of detail0. Similarly, "${result.detail4.url}" indicates to replace the value of the parameter with an item name (key) "url" included in the processing result (result) of detail4.

Referring back to FIG. 27, the subsequent processes of steps S2705 and S2706 are the same as the processes of steps S1205 and S1206 of FIG. 12, and therefore descriptions of these steps are omitted.

When the barcode recognition component 402 is returned, the flow executing unit 301 sends a request to acquire a parameter of the component, to the parameter evaluating unit 307 (step S2707). Note that the acquisition request includes, for example, a flow detail name "detail0" of the flow detail 1111 and each item name of the parameter (specifically, "skip" and "filename", etc.).

When the parameter evaluating unit 307 receives the request to acquire a parameter, the parameter evaluating unit 307 sends the request to acquire a parameter to the resource managing unit 306 (step S2708).

Next, when the resource managing unit 306 receives the request to acquire a parameter, the resource managing unit 306 acquires the parameter 1721 included in the resource management information 170D illustrated in FIG. 29 (step S2709). Then, the resource managing unit 306 returns the acquired parameter 1721 to the parameter evaluating unit 307.

Next, the parameter evaluating unit 307 determines whether the parameter 1721 returned from the resource managing unit 306 includes a replacement specification (step S2710). Here, the parameter 1721 does not include a replacement specification. Therefore, the parameter evaluating unit 307 determines that the parameter 1721 does not include a replacement specification. In this case, the parameter evaluating unit 307 returns the parameter 1721, which has been returned from the resource managing unit 306, to the flow executing unit 301.

The subsequent processes of steps S2711 through S2715 are the same as the processes of steps S1209 through S1213 of FIG. 12, and therefore descriptions of these steps are omitted.

When the branch component 401 is returned, the flow executing unit 301 sends a request to acquire a parameter of the component, to the parameter evaluating unit 307 (step S2716). Note that the acquisition request includes, for example, a flow detail name "detail1" of the flow detail 1112 and each item name of the parameter.

When the parameter evaluating unit 307 receives the request to acquire a parameter, the parameter evaluating unit 307 sends the request to acquire a parameter to the resource managing unit 306 (step S2717).

Next, when the resource managing unit 306 receives the request to acquire a parameter, the resource managing unit 306 acquires the parameter 1722 included in the resource management information 170D illustrated in FIG. 29 (step S2718). Then, the resource managing unit 306 returns the acquired parameter 1722 to the parameter evaluating unit 307.

Next, the parameter evaluating unit 307 determines whether the parameter 1722 returned from the resource managing unit 306 includes a replacement specification (step S2719). Here, the parameter 1722 includes the replacement specification "${result.detail0.value}". Therefore, the parameter evaluating unit 307 determines that the parameter 1722 includes a replacement specification.

In this case, the parameter evaluating unit 307 sends a request to acquire a processing result to the resource managing unit 306 (step S2720). Note that the acquisition request includes the replacement specification (specifically, "result.detail0.value", which is the storage destination of the processing result, etc.).

When the resource managing unit 306 receives the request to acquire the processing result, the resource managing unit 306 acquires the processing result included in the resource management information 170D (step S2721). Then, the resource managing unit 306 returns the acquired processing result to the parameter evaluating unit 307.

That is, the resource managing unit 306 acquires the value "storageA" of the item name "value", from the processing result (result) of the barcode recognition component 402 (detail0) stored in the resource management information 170D. Then, the resource managing unit 306 returns the acquired value "storageA" to the parameter evaluating unit 307.

Next, when the parameter evaluating unit 307 receives the processing result, the parameter evaluating unit 307 replaces the value of the parameter for which a replacement is specified, with the value indicated by the processing result (step S2722). That is, the parameter evaluating unit 307 replaces "left":"${result.detail0.value}" with "left":"storageA".

Then, the parameter evaluating unit 307 returns the parameter 1722 after the replacement, to the flow executing unit 301.

The subsequent processes of steps S2723 through S2727 are the same as the processes of steps S1215 through S1220 of FIG. 12, and therefore descriptions of these steps are omitted.

When the storage A delivery component 403 is returned, the flow executing unit 301 sends a request to acquire a parameter of the component, to the parameter evaluating unit 307 (step S2728). Note that the acquisition request includes, for example, a flow detail name "detail2" of the flow detail 1112 and each item name of the parameter.

When the parameter evaluating unit 307 receives the request to acquire a parameter, the parameter evaluating unit 307 sends the request to acquire a parameter to the resource managing unit 306 (step S2729).

Next, when the resource managing unit 306 receives the request to acquire a parameter, the resource managing unit 306 acquires the parameter 1723 included in the resource management information 170D illustrated in FIG. 29 (step S2730). Then, the resource managing unit 306 returns the acquired parameter 1723 to the parameter evaluating unit 307.

Next, the parameter evaluating unit 307 determines whether the parameter 1723 returned from the resource managing unit 306 includes a replacement specification (step S2731). Here, the parameter 1723 does not include a replacement specification. Therefore, the parameter evaluating unit 307 determines that the parameter 1723 does not include a replacement specification. In this case, the parameter evaluating unit 307 returns the parameter 1723, which has been returned from the resource managing unit 306, to the flow executing unit 301.

The subsequent processes of steps S2732 through S2736 are the same as the processes of steps S1223 through S1227 of FIG. 12, and therefore descriptions of these steps are omitted.

When the storage B delivery component 404 is returned, the flow executing unit 301 sends a request to acquire a parameter of the component, to the parameter evaluating unit 307 (step S2737). Note that the acquisition request includes, for example, a flow detail name "detail3" of the flow detail 1114 and each item name of the parameter.

When the parameter evaluating unit 307 receives the request to acquire a parameter, the parameter evaluating unit 307 sends the request to acquire a parameter to the resource managing unit 306 (step S2738).

Next, when the resource managing unit 306 receives the request to acquire a parameter, the resource managing unit 306 acquires the parameter 1724 included in the resource management information 170D illustrated in FIG. 29 (step S2739). Then, the resource managing unit 306 returns the acquired parameter 1724 to the parameter evaluating unit 307.

Next, the parameter evaluating unit 307 determines whether the parameter 1724 returned from the resource managing unit 306 includes a replacement specification (step S2740). Here, the parameter 1724 does not include a replacement specification. Therefore, the parameter evaluating unit 307 determines that the parameter 1724 does not include a replacement specification. In this case, the parameter evaluating unit 307 returns the parameter 1724, which has been returned from the resource managing unit 306, to the flow executing unit 301.

Note that the subsequent process of step S2741 is the same as the process of step S1230 of FIG. 12, and therefore descriptions of this step are omitted.

When the flow executing unit 301 determines to skip the process of the component in step S2741, the flow executing unit 301 sends a request to acquire the next component based on the process flow information 1100, to the component managing unit 302 (step S2742).

That is, the flow executing unit 301 sends a request to acquire the "merge component" specified in the flow detail 1116 of the process flow information 1100 illustrated in FIG. 26, to the component managing unit 302.

When the component managing unit 302 receives the request to acquire a component, the component managing unit 302 generates the merge component 408 (step S2743). Note that the merge component 408 may be generated by using the API for generating a component defined in the component common I/F 400.

Then, the component managing unit 302 returns the generated merge component 408 to the flow executing unit 301. That is, the component managing unit 302 returns an address in a memory (for example, the RAM 14) in which the merge component 408 is loaded, to the flow executing unit 301.

When the merge component 408 is returned, the flow executing unit 301 sends a request to acquire a parameter of the component, to the parameter evaluating unit 307 (step S2744). Note that the acquisition request includes, for example, a flow detail name "detail4" of the flow detail 1116 and each item name of the parameter.

When the parameter evaluating unit 307 receives the request to acquire a parameter, the parameter evaluating unit 307 sends the request to acquire a parameter to the resource managing unit 306 (step S2745).

Next, when the resource managing unit 306 receives the request to acquire a parameter, the resource managing unit 306 acquires a parameter 1726 included in the resource management information 170D illustrated in FIG. 29 (step S2746). Then, the resource managing unit 306 returns the acquired parameter 1726 to the parameter evaluating unit 307.

Next, the parameter evaluating unit 307 determines whether the parameter 1726 returned from the resource managing unit 306 includes a replacement specification (step S2747). Here, the parameter 1726 does not include a replacement specification. Therefore, the parameter evaluating unit 307 determines that the parameter 1726 does not include a replacement specification. In this case, the parameter evaluating unit 307 returns the parameter 1726, which has been returned from the resource managing unit 306, to the flow executing unit 301.

Next, when the flow executing unit 301 receives the parameter 1726, the flow executing unit 301 determines whether to skip the process of the merge component 408, based on the "skip" parameter included in the parameter 1726 (step S2748). Here, the "skip" parameter included in the parameter 1726 is "false", and therefore the flow executing unit 301 determines not to skip the process of the merge component 408.

The flow executing unit 301 sends a component execution request to the merge component 408 (step S2749). Note that the execution request includes data and the parameter 1726.

When the merge component 408 receives the component execution request, the merge component 408 performs an execution process of the component (step S2750). Then, the merge component 408 returns data indicating the processing result of the executed process, to the flow executing unit 301.

Figure 30:
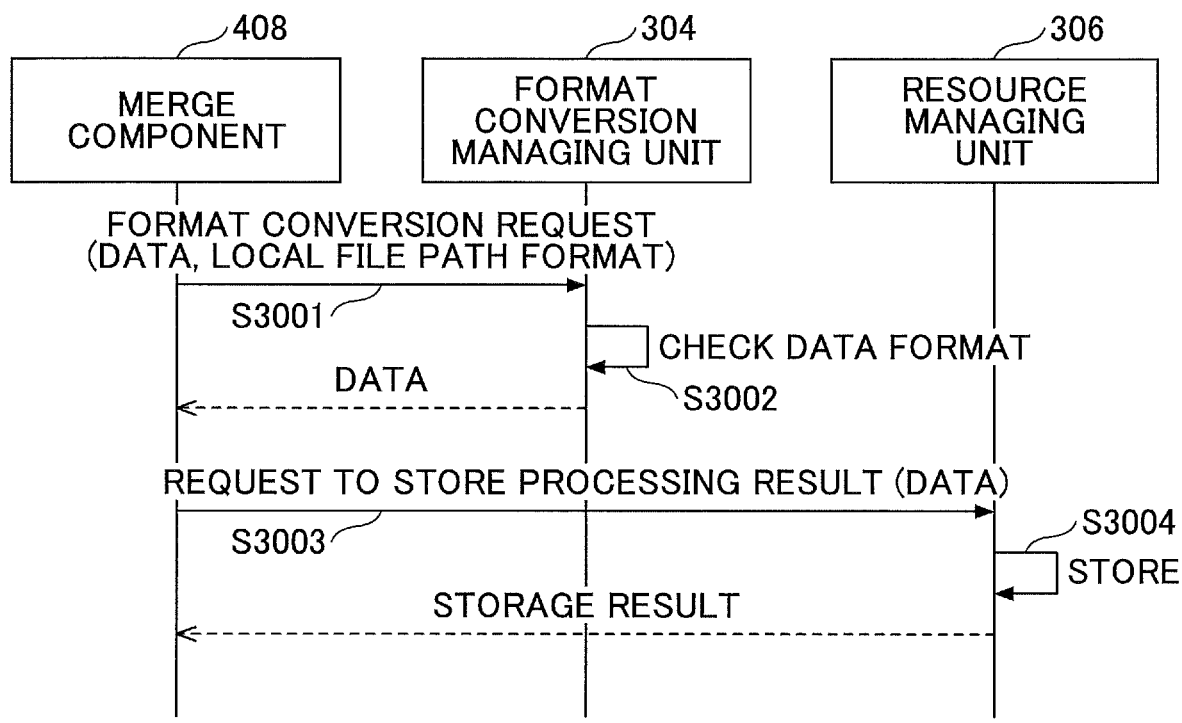
FIG. 30 is a sequence diagram of an example of the execution process of a merge component according to the second embodiment of the present invention.

Here, a description is given of the execution process of the merge component 408, by referring to FIG. 30. FIG. 30 is a sequence diagram of an example of the execution process of the merge component 408 according to the present embodiment.

First, the merge component 408 sends a format conversion request to the format conversion managing unit 304 (step S3001). Note that the format conversion request includes data and a specification of "LocalFilePath" indicating the data format that can be handled by the merge component 408.

When the format conversion managing unit 304 receives the format conversion request, the format conversion managing unit 304 checks whether the data format of the data included in the format conversion request and the specified data format match each other (step S3002).

Here, the data format of the data included in the received format conversion request is "LocalFilePath", and the specified data format is also "LocalFilePath". Therefore, the format conversion managing unit 304 determines that the data format of the data included in the format conversion request and the specified data format match each other.

Then, the format conversion managing unit 304 returns the data included in the format conversion request to the merge component 408. In this way, when the data formats are determined to match each other in the data format check, the format conversion managing unit 304 does not generate a format conversion.

When the merge component 408 receives the data, the merge component 408 sends a request to store the processing result to the resource managing unit 306 (step S3003). Note that the storage request includes data indicating the result of the preceding component (that is, the storage A delivery component 403).

When the resource managing unit 306 receives the request to store the processing result, the resource managing unit 306 creates the processing result based on data included in the storage request, and stores the processing result in the processing result 173 of the resource management information 170D (step S3004). Then, the resource managing unit 306 returns the storage result to the merge component 408.

Here, a description is given of the processing result of the merge component 408 stored in the resource management information 170D, by referring to FIGS. 31A and 31B. FIGS. 31A and 31B are for describing examples of storing the processing result of the merge component 408 in the resource management information 170D.

First, it is assumed that the resource management information 170D before the process of step S3003 described above is executed is as illustrated in FIG. 31A. That is, it is assumed that a processing result 1733 of the storage A delivery component 403 is stored in the resource management information 170D.

At this time, in step S3003 described above, the merge component 408 sends a storage request including the data indicating the processing result 1733, to the resource managing unit 306. Accordingly, a processing result 1735 of the merge component 408 (that is, the same processing results as those of the processing result 1733) is stored in the resource management information 170D, as illustrated in FIG. 31B.

As described above, the merge component 408 stores the same processing results as those of the preceding component executed previously (that is, the storage A delivery component 403), in the resource management information 170D. Accordingly, the mail delivery component 405 only needs to use the processing result 1735 of the merge component 408, and there is no need to specify a parameter according to branching by the branch component 401. That is, for example, the mail delivery component 405 does not need to specify both the parameter in the case where the storage A delivery component 403 is executed and the parameter in the case where the storage B delivery component 404 is executed.

Referring back to FIG. 28, when the flow executing unit 301 receives the data indicating the processing result of the process of executing the component, the flow executing unit 301 sends a request to acquire a component based on the process flow information 1100 illustrated in FIG. 26, to the component managing unit 302 (step S2751).

That is, the flow executing unit 301 sends a request to acquire the component "mail delivery component" specified in the flow detail 1115A of the process flow information 1100 illustrated in FIG. 26, to the component managing unit 302.

The subsequent process of step S2752 is the same as the process of step S1232 of FIG. 12, and therefore descriptions of this step are omitted.

When the mail delivery component 405 is returned, the flow executing unit 301 sends a request to acquire a parameter of the component, to the parameter evaluating unit 307 (step S2753). Note that the acquisition request includes, for example, a flow detail name "detail5" of the flow detail 1115A, and the item names of parameters (specifically, "skip", "to", "from", "subject", and "body", etc.).

When the parameter evaluating unit 307 receives the request to acquire a parameter, the parameter evaluating unit 307 sends the request to acquire a parameter to the resource managing unit 306 (step S2754).

Next, when the resource managing unit 306 receives the request to acquire a parameter, the resource managing unit 306 acquires the parameter 1725A included in the resource management information 170D illustrated in FIG. 29 (step S2755). Then, the resource managing unit 306 returns the acquired parameter 1725A to the parameter evaluating unit 307.

Next, the parameter evaluating unit 307 determines whether the parameter 1725A returned from the resource managing unit 306 includes a replacement specification (step S2756). Here, the parameter 1725A includes the replacement specification "${result.detail4.url}". Therefore, the parameter evaluating unit 307 determines that the parameter 1725A includes a replacement specification.

In this case, the parameter evaluating unit 307 sends a request to acquire a processing result to the resource managing unit 306 (step S2757). Note that the acquisition request includes the replacement specification (specifically, "result.detail4.url", which is the storage destination of the processing result, etc.).

When the resource managing unit 306 receives the request to acquire the processing result, the resource managing unit 306 acquires the processing result included in the resource management information 170D (step S2758). Then, the resource managing unit 306 returns the acquired processing result to the parameter evaluating unit 307.

That is, the resource managing unit 306 acquires the value "http://storageA.co.jp/fileid" of the item name "url", from the processing result (result) of the merge component 408 (detail4) stored in the resource management information 170D illustrated in FIG. 31B. Then, the resource managing unit 306 returns the acquired value "http://storageA.co.jp/fileid" to the parameter evaluating unit 307.

Next, when the parameter evaluating unit 307 receives the processing result, the parameter evaluating unit 307 replaces the value of the parameter for which a replacement is specified, with the value indicated by the processing result (step S2759). That is, the parameter evaluating unit 307 replaces "body":"${result.detail4.url}" with "body": "http://storageA.co.jp/fileid".

Then, the parameter evaluating unit 307 returns the parameter 1725A after the replacement, to the flow executing unit 301.

The subsequent processes of steps S2760 through S2762 are the same as the processes of steps S1235 through S1237 of FIG. 12, and therefore descriptions of these steps are omitted.

As described above, in the service providing system 10 according to the present embodiment, even when branching is included in the process flow, by using the merge component 408, the components following the merge component 408 can perform processes without considering the branching. Therefore, for example, the user such as the creator, etc., of the process flow information 1100 can easily specify a parameter, etc., to be used by each component following the merge component 408.

Here, another example of a process flow using the merge component 408 is described by referring to FIG. 32. FIG. 32 is a diagram for describing another example of a process flow (part 3).

In the process flow illustrated in FIG. 32, first, a process by a component A is executed. Subsequently, a process by a component B, a process by a component C, and a process by a component D are executed in parallel, and then a process by the merge component 408 and the process by a component E are sequentially executed. Furthermore, the process by the component B, the process by the component C, and the process by the component D respectively output "file1", "file2", and "file3" as processing results.

At this time, the merge component 408 outputs various processing results to the component E, according to a condition specified in the parameter.

For example, the merge component 408 may output a file created by merging "file1", "file2", and "file3" as a processing result to the component E, according to the condition.

Furthermore, for example, the merge component 408 may output any one of "file1", "file2", and "file3" as a processing result to the component E, according to the condition. In this case, for example, the condition is to output the first file or the last file that has been output, among "file1", "file2", and "file3", as the processing result, to the component E. Furthermore, among "file1", "file2", and "file3", a file having a predetermined file name or a file having a file size that is less than a predetermined file size (or greater than or equal to a predetermined file size) may be output as the processing result, to the component E.

As described above, the merge component 408 may not only be used when the process flow includes branching, but also when the process flow includes processes that are to be executed in parallel. Note that in the parameters of the merge component 408, various conditions expressed by a logical sum and a logical product may be specified. Accordingly, the merge component 408 can output various processing results to the following component, when the processes of preceding components are executed in parallel.

As described above, in the service providing system 10 according to the first embodiment, when the sequence of processes for implementing a service includes branching, among the components to execute following processes, the execution of a process of a component other than one component is suppressed (skipped). Therefore, in the service providing system 10 according to the first embodiment, even when branching is included in the sequence of processes, it is possible to execute the sequence of processes.

Moreover, the service providing system 10 according to the first embodiment determines whether to execute or suppress the process of one of the branching destinations, according to the processing result of a component that has already been executed. Therefore, the service providing system 10 according to the first embodiment can dynamically determine the process of the branching destination according to an electronic file, etc., of a processing target of the sequence of processes.

Furthermore, in the service providing system 10 according to the second embodiment, when the sequence of processes for implementing a service includes branching, by using the merge component 408, the components subsequent to the merge component 408 do not need to consider the branching. Therefore, in the service providing system 10 according to the second embodiment, for example, the user such as the creator, etc., of the process flow can easily specify the parameter of each component subsequent to the merge component 408.

According to one embodiment of the present invention, a sequence of processes including branching can be executed.

The information processing system, the information processing apparatus, and the information processing method are not limited to the specific embodiments described in the detailed description, and variations and modifications may be made without departing from the spirit and scope of the present invention.

What is claimed is:

1. An information processing system including one or more information processing apparatuses coupled via a network configured to implement various functions of the information processing system, the information processing system comprising:
   a memory configured to store
      flow information and flow identification information identifying the flow information in association with each other for each sequence of processes performed by using electronic data, the flow information defining program identification information identifying one or more programs for respectively executing the processes included in the sequence of processes, the flow information also defining an execution order of executing the one or more programs, and
      computer-executable instructions; and
   one or more processors configured to execute the computer-executable instructions such that the one or more processors execute a process including:
      accepting, over a communication channel, a request including information relating to the electronic data used in the sequence of processes and the flow identification information, from one of one or more devices coupled to the information processing system;
      acquiring the flow information stored in the memory in association with the flow identification information included in the request, when the request is accepted; and
      executing the sequence of processes using the electronic data based on the information relating to the electronic data, by respectively executing the one or more programs identified by the program identification information defined in the acquired flow information, in the execution order defined in the acquired flow information,
   wherein when the sequence of processes includes branching, the executing includes branching the processes included in the sequence of processes according to a condition of the branching, to execute the sequence of processes,
   wherein the branching branches the sequence of processes into storing the electronic data in one of a plurality of different external storages, and wherein the flow information defines a flow detail name for each process in the sequence of processes thereby distinguishing a plurality of processes in the sequence of processes to be executed by a same component, which is implemented by programs and modules, by flow detail names, wherein the branching includes determining whether number of different flow details immediately before a given flow detail name is greater than or equal to 2 thereby determining whether a process having the given flow detail name is executed by a merging component.

2. The information processing system according to claim 1, wherein when the sequence of processes includes the branching, the executing includes executing a first program among the one or more programs for respectively executing the branched processes, according to the condition of the branching, and executing one or more following programs for respectively executing one or more following processes following a process executed by the first program, according to the condition of the branching.

3. The information processing system according to claim 2, wherein when the sequence of processes includes the branching, the executing includes suppressing execution of another program other than the first program, among the one or more programs for respectively executing the branched processes.

4. The information processing system according to claim 3, wherein
the one or more programs for respectively executing the processes included in the sequence of processes include a branch program for suppressing the execution of the other program, among the one or more programs for respectively executing the branched processes, and
when the sequence of processes includes the branching, the executing includes executing the branch program to suppress the execution of the other program, among the one or more programs for respectively executing the branched processes.

5. The information processing system according to claim 4, wherein
the branch program identifies the other program based on a processing result of a program executed before the branch program, among the one or more programs for respectively executing the processes included in the sequence of processes, and
the branch program suppresses the execution of the identified other program.

6. The information processing system according to claim 2, wherein
the one or more programs for respectively executing the processes included in the sequence of processes include a merge program for outputting a processing result of the branched processes to a program for executing a following process, and
when the sequence of processes includes the branching, the executing includes executing the merge program to output the processing result of the branched processes to the program for executing the following process, to execute the one or more programs for respectively executing the one or more processes including the following process in the sequence of processes.

7. The information processing system according to claim 6, wherein the following process includes delivering a mail along with a storage destination URL of an external storage in which the electronic data is stored, to a specified mail address.

8. The information processing system according to claim 1, wherein
the executing includes converting a data format of the electronic data into a predetermined data format, and
after the data format of the electronic data is converted into a data format that can be processed by the one or more programs, the one or more programs execute the processes included in the sequence of processes, to execute the sequence of processes using the electronic data.

9. The information processing system according to claim 1, wherein
the one or more programs for respectively executing the processes included in the sequence of processes include an external service program for executing a process relating to an external service, for each external service, and
the external service program includes at least a program for executing a process of uploading the electronic data with respect to the external service.

10. The information processing system according to claim 9, wherein when the sequence of processes includes the branching, the executing includes branching the processes included in the sequence of processes to a process executed by a first external service program among a plurality of the external service programs according to the condition of the branching, to execute the sequence of processes.

11. The information processing system according to claim 10, wherein
the one or more programs for respectively executing the processes included in the sequence of processes include a code acquiring program for executing a process of acquiring predetermined code information included in the electronic data used in the sequence of processes, and
when the sequence of processes includes the branching, the executing includes branching the processes included in the sequence of processes to the process executed by the first external service program corresponding to the external service specified in the predetermined code information acquired by the process executed by the code acquiring program, among the plurality of the external service programs, to execute the sequence of processes.

12. The information processing system according to claim 1, wherein the branching includes a component common interface.

13. The information processing system according to claim 1, wherein the process further includes replacing a value of a parameter that is indicated to be replaced in the flow information.

14. The information processing system according to claim 13, wherein the value of the parameter determines whether one of the plurality of processes to be executed by a same program is skipped.

15. The information processing system according to claim 1, wherein the process further includes merging by storing a same processing results as that of a preceding component executed.

16. The information processing system according to claim 15, wherein the merging includes outputting any of a plurality of files to a following component according to an order of receipt, a name of a file or a size of each of the plurality of files.

17. The information processing system according to claim 1, wherein the process further includes providing different names to the plurality of processes that are performed by a same program.

18. An information processing apparatus comprising:
a memory configured to store
flow information and flow identification information identifying the flow information in association with each other for each sequence of processes performed by using electronic data, the flow information defining program identification information identifying one or more programs for respectively executing the processes included in the sequence of processes, the flow information also defining an execution order of executing the one or more programs, and
computer-executable instructions; and
one or more processors configured to execute the computer-executable instructions such that the one or more processors execute a process including:
accepting, over a communication channel, a request including information relating to the electronic data used in the sequence of processes and the flow identification information, from one of one or more devices coupled to the information processing system;
acquiring the flow information stored in the memory in association with the flow identification information included in the request, when the request is accepted; and
executing the sequence of processes using the electronic data based on the information relating to the electronic data, by respectively executing the one or more programs identified by the program identification information defined in the acquired flow information, in the execution order defined in the acquired flow information,
wherein when the sequence of processes includes branching, the executing includes branching the processes included in the sequence of processes according to a condition of the branching, to execute the sequence of processes,
wherein the branching branches the sequence of processes into storing the electronic data in one of a plurality of different external storages,
wherein the flow information defines a flow detail name for each process in the sequence of processes thereby distinguishing a plurality of processes in the sequence of processes to be executed by a same component, which is implemented by programs and modules, by flow detail names, and
wherein the branching includes determining whether number of different flow details immediately before a given flow detail name is greater than or equal to 2 thereby determining whether a process having the given flow detail name is executed by a merging component.

19. An information processing method executed by a computer, the information processing method being implemented in an information processing system including
one or more information processing apparatuses coupled via a network configured to implement various functions of the information processing system, and
a memory configured to store flow information and flow identification information identifying the flow information in association with each other for each sequence of processes performed by using electronic data, the flow information defining program identification information identifying one or more programs for respectively executing the processes included in the sequence of processes, the flow information also defining an execution order of executing the one or more programs,
information processing method comprising:
accepting, over a communication channel, a request including information relating to the electronic data used in the sequence of processes and the flow identification information, from one of one or more devices coupled to the information processing system;
acquiring the flow information stored in the memory in association with the flow identification information included in the request, when the request is accepted; and
executing the sequence of processes using the electronic data based on the information relating to the electronic data, by respectively executing the one or more programs identified by the program identification information defined in the acquired flow information, in the execution order defined in the acquired flow information,
wherein when the sequence of processes includes branching, the executing includes branching the processes included in the sequence of processes according to a condition of the branching, to execute the sequence of processes, and
wherein the branching branches the sequence of processes into storing the electronic data in one of a plurality of different external storages, and
wherein the flow information defines a flow detail name for each process in the sequence of processes thereby distinguishing a plurality of processes in the sequence of processes to be executed by a same component, which is implemented by programs and modules, by flow detail names, and
wherein the branching includes determining whether number of different flow details immediately before a given flow detail name is greater than or equal to 2 thereby determining whether a process having the given flow detail name is executed by a merging component.

* * * * *